March 18, 1969  A. F. CUMMINGS  3,433,441
FLEXIBLE AERODYNAMIC BODY
Filed May 16, 1966  Sheet 2 of 8

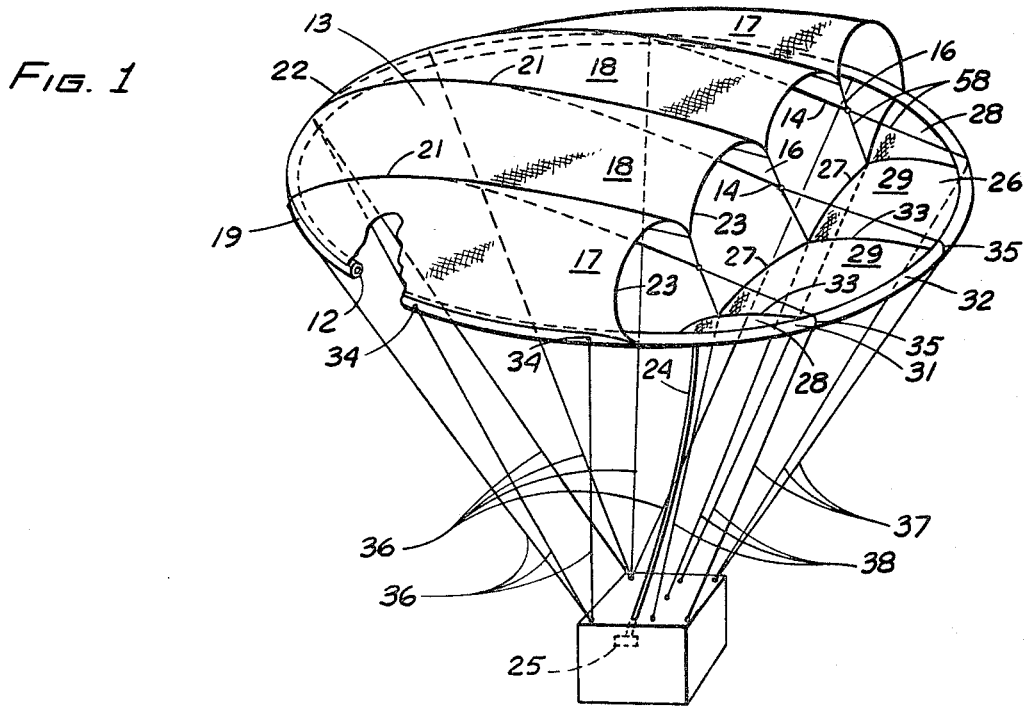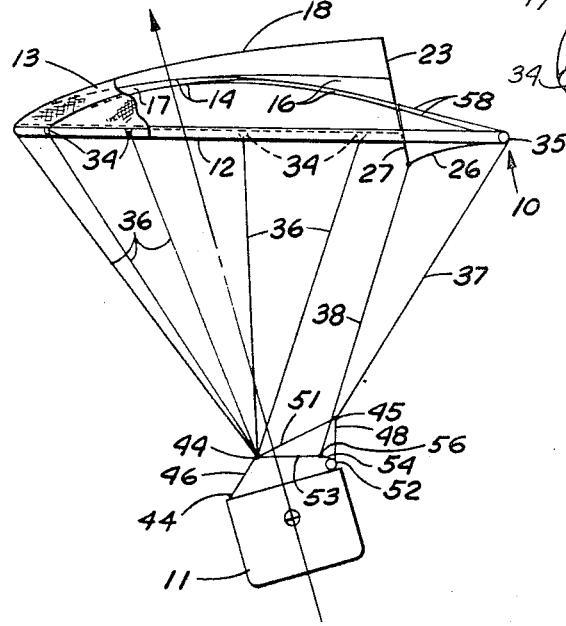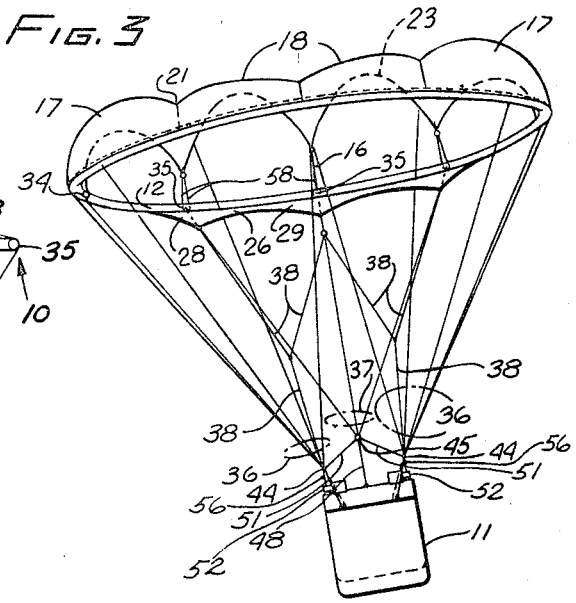

INVENTOR.
ALAN F. CUMMINGS
BY Richard D. Seibel
ATTORNEY

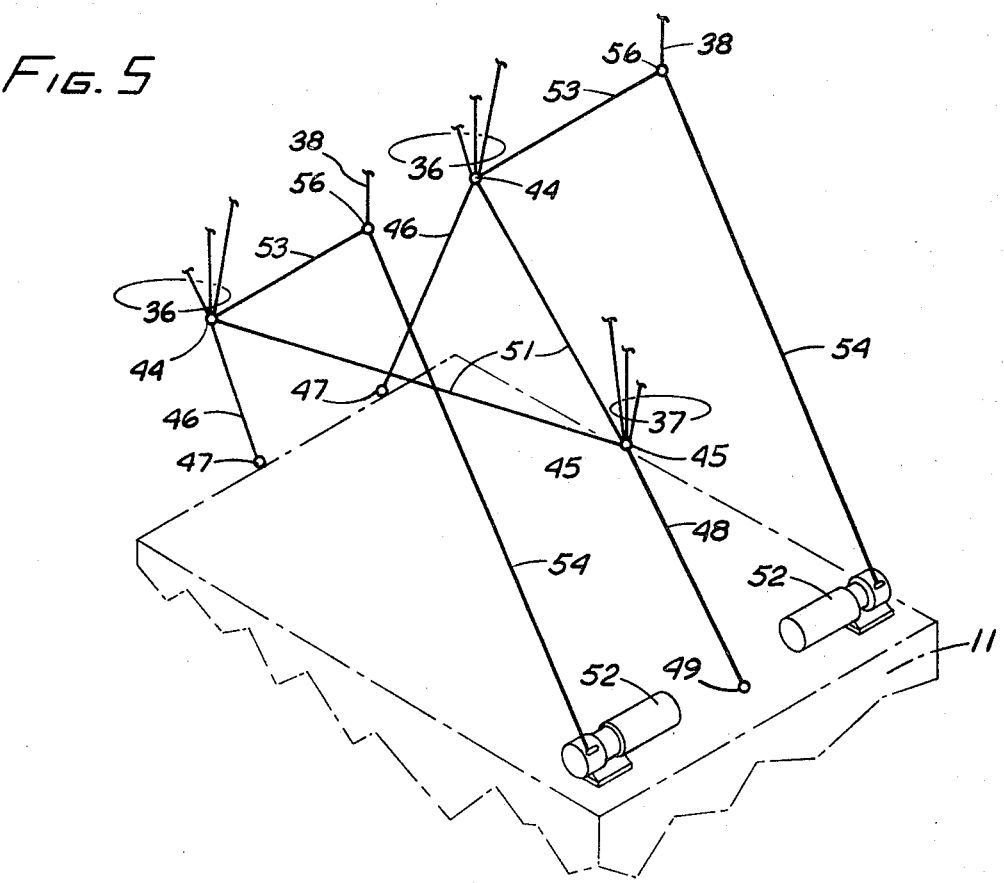
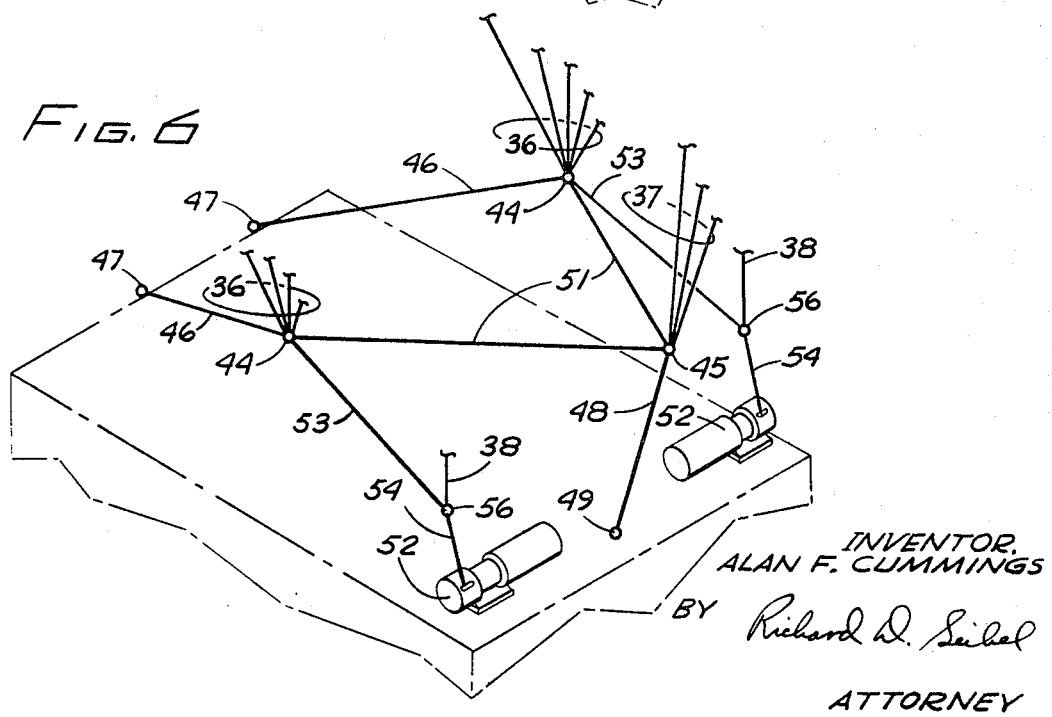

INVENTOR
ALAN F. CUMMINGS

BY Richard D. Seibel

ATTORNEY

March 18, 1969 A. F. CUMMINGS 3,433,441
FLEXIBLE AERODYNAMIC BODY
Filed May 16, 1966 Sheet 6 of 8

INVENTOR.
ALAN F. CUMMINGS
By Richard D. Seibel
ATTORNEY

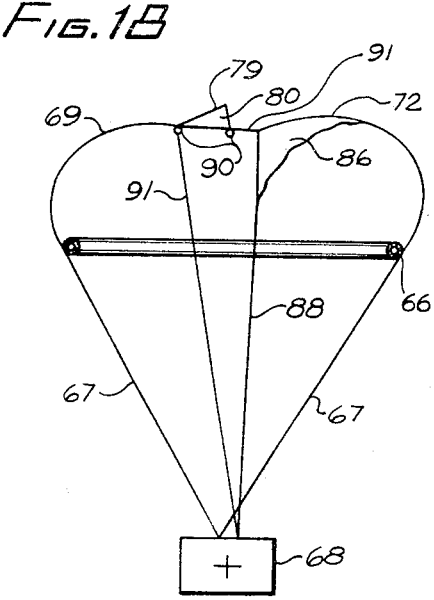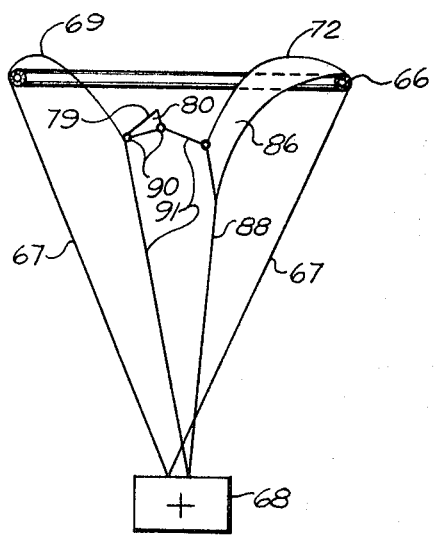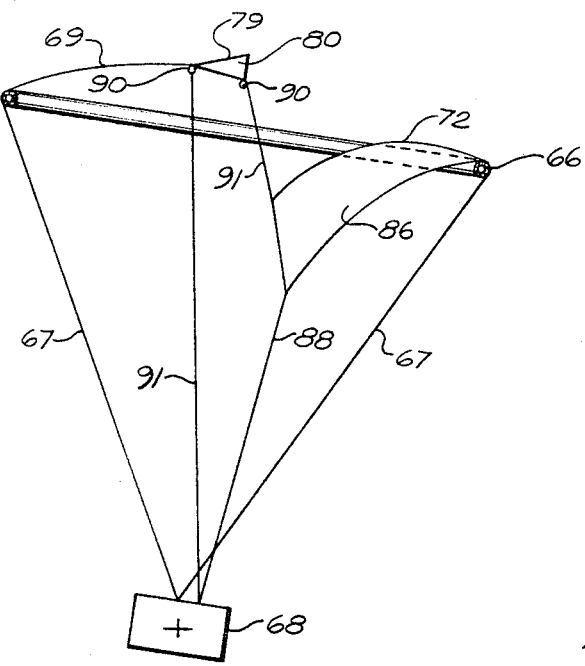

United States Patent Office 3,433,441
Patented Mar. 18, 1969

3,433,441
FLEXIBLE AERODYNAMIC BODY
Alan F. Cummings, Downey, Calif., assignor to
North American Rockwell Corporation
Filed May 16, 1966, Ser. No. 550,448
U.S. Cl. 244—138                                    35 Claims
Int. Cl. B64d 17/34, 17/18, 17/14

ABSTRACT OF THE DISCLOSURE

A flexible gliding vehicle is described having an inflatable circular rim from which a payload is suspended somewhat in the manner of a parachute. A fabric airfoil sail extends across the forward portion of the rim to form a lifting surface, and a fabric airfoil flap extends across the aft portion of the rim for providing aerodynamic stability. The effective angle of attack of the flap is no greater than the angle of attack of the sail for stability. An open slot extends substantially across the rim transverse to the normal flight direction. Control of gliding flight is obtained by variations of flap position with control of flap position with control lines from the payload. Rigging, deployment and flight procedures are also described.

---

In order to recover objects from high altitude it is often desirable to employ a parachute. Such a system has only a vertical velocity and no horizontal velocity except as may be dictated by prevailing winds. Because of this a parachute brings its payload down to a landing site determined by the point of deployment of the parachute. A parachute is, however, a desirable system for many applications since it is highly developed and a highly reliable landing system.

In recent years a new family of parachutes has been developed to give the parachute some maneuvering potential. These steerable parachutes involve special vents or flaps which essentially provide thrust in a horizontal direction by bleeding air from the parachute canopy. The best circular steerable parachute designed to date have a lift over drag ratio ($L/D$) in the order of about 1.5. The maneuvering range of such a steerable parachute is relatively limited as will be apparent from the magnitude of the $L/D$ ratio, however the deployment reliability of a conventional parachute is retained. Attempts to achieve higher $L/D$ ratios have resulted in the leading edge of the parachute folding or collapsing due to the horizontal velocity of gliding flight. Artificially rigidified leading edges have not provided a completely satisfactory answer to this problem since such parachutes have an inherent lack of pitch stability and even with an inflated leading edge the maximum attainable $L/D$ is typically less than about two. A "cloverleaf" shape parachute has been reported with an $L/D$ of about 2.2 without indication being given of the pitch stability.

In order to provide a higher $L/D$ ratio glider-like devices have been devised. In general these employ inflatable or other artificially rigidified booms having a fabric web therebetween. Typical of such devices is the so-called Rogallo wing or Paraglider wherein an $L/D$ of around 4 is obtainable. A difficulty is encountered with such flexible vehicles because of the lack of inherent pitch stability and also in many models a lack of lateral stability. Because of the geometry of these vehicles, large bending moments are encountered in the booms and large cross-section, heavy structures are required. In addition to these drawbacks these inflatable structures have severe deployment limitations which affect the reliability of the vehicle for air drops. The paraglider type vehicles are also heavy compared with a conventional parachute.

It is therefore a broad object of this invention to provide a highly reliable flexible aerodynamic vehicle with a high lift over drag ratio.

Thus in the practice of this invention according to a preferred embodiment there is provided a toroidal inflatable rim having three parallel catenary lines running between edges of the rim in a direction along a flight path when the vehicle is gliding. A tailored fabric sail is attached to the rim around a portion of the periphery thereof and is also secured to the catenary lines. Under aerodynamic loading the sail is billowed into four lobes, each lobe being between the rim and a catenary line or between adjacent catenary lines. The sail is tailored so that the individual lobes have longitudinal camber to provide lift. Fabric catenary curtains are provided between the interlobe nodes on the sail and the catenary lines thereby providing vertical surfaces to enhance lateral stability.

A fabric flap is secured to the rim around a portion of the periphery thereof aft of the sail. The flap is tailored so as to have camber under aerodynamic loading in a manner similar to the sail. The average chord line of the flap has aerodynamic decalage relative to the average chord line of the sail to provide pitch stability while gliding. The leading edge of the flap and the trailing edge of the sail have a gap therebetween through which air is free to flow during gliding flight. Lines are provided interconnecting the trailing edge of the catenary curtains and the leading edge of the flap.

Riser lines are provided from the inflatable rim to a payload. In addition control lines are provided between the leading edge of the flap and the payload. Electrically controlled winches are provided on the payload for adjusting the relative lengths of the control lines and the riser lines to shift the center of gravity of the payload relative to the inflatable rim. Control of the vehicle is obtained by center of gravity shift which controls the angle of attack of the vehicle when the center of gravity is shifted fore and aft and gives roll control when the center of gravity is shifted from side to side. A vehicle of this type is comparable to a conventional parachute and the capabilities are much greater.

Thus it is a broad object of this invention to provide a flexible aerodynamic body.

It is another object of this invention to provide a high $L/D$ vehicle having pitch and lateral stability.

It is a further object of this invention to provide a means for controlling an aerodynamic body.

It is another object of this invention to provide a readily deployable aerodynamic vehicle.

Other objects and many of the attendant advantages of this invention will be readily appreciated as the same becomes better understood by reference to the following detailed description when considered in connection with the accompanying drawings wherein:

FIG. 1 is a perspective view of a gliding flexible body as provided in a preferred embodiment of this invention;

FIG. 2 is a side sectional view of the vehicle of FIG. 1;

FIG. 3 is an end elevation of the vehicle of FIG. 1 as viewed along an angle of attack parallel to an average chord line of the sail;

FIG. 5 is a perspective of a typical control arrangement for a vehicle of the type illustrated in FIG. 1 in a position for maximum vertical descent and minimum horizontal velocity;

FIG. 6 is a perspective of the control arrangement of FIG. 5 in a position for maximum lift over drag ratio;

FIG. 18 shows schematically a vehicle in vertical descent with the rim uninflated;

FIG. 20 shows schematically a vehicle in vertical descent with the rim inflated; and FIG. 21 shows schematically a vehicle in gliding flight.

Throughout the figures like reference numerals refer to like parts.

Figure 4A:
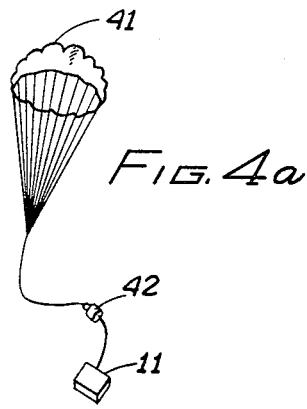
FIGURES 4a–4f are a typical deployment sequence of a body of the type provided in the practice of this invention.
Figure 4B:
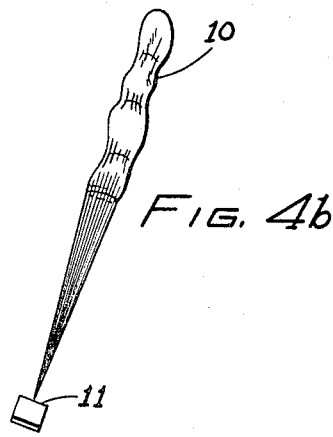

One of the principal difficulties with flexible gliding vehicles has been lack of inherent aerodynamic stability. These vehicles have locked static and dynamic pitch stability due to a lack of aerodynamic reflex or decalage. Additionally such vehicles have lacked stability due to insufficient vertical or near vertical surfaces. The deployment of many flexible vehicles from a folded condition has been a severe limitation due to relatively low reliability as compared with conventional parachutes. The present invention in a preferred embodiment provides areodynamic decalage and pitch stability by providing a high lift sail and separated therefrom a lifting flap which is arranged relative to the sail to provide aerodynamic decalage, that is, the sail and flap have different effective angles of attack during gliding. Because of the high lobes of the sail there is a steep side portion to each lobe that provides a substantially vertical surface for lateral stability. To augment these near vertical surfaces, vertical curtains may also be employed at the nodes of the sail. Deployment is highly reliable since it parallels almost exactly the deployment of a conventional parachute.

FIG. 1 illustrates a high lift over drag flexible vehicle incorporating the principles of this invention. In the vehicle illustrated in FIG. 1 the direction of flight is toward the left side of the figure. As illustrated in this embodiment there is provided a lifting body 10 having suspended beneath it a payload or payload supporting platform 11. The lifting body has a circular inflatable rim 12 which is preferably a woven or knitted fabric tube with a rubber or plastic inner tube (not shown). Alternatively the inflatable toroidal rim can comprise a polyurethane coated polyester fabric torus that is gas tight and needs no inner tube or the rim can be some other type of artifiicially rigidifiable structure.

An inflation tube 24 is provided from the rim 12 to a source of pressuring gas 25 aboard the payload 11. A conventional gas generator or pump or a container of compressed gas serves as a convenient source of pressurizing gas.

A fabric sail 13 of ripstop nylon, polyester or other high strength textile or other flexible sheet material is secured to the rim continuously around a portion of the periphery thereof by stitching, cementing or a combination of the two techniques. A suitable polyester fabric is, for example, woven from Dacron fiber available from E. I. du Pont de Nemours and Company, Wilmington, Del. In the preferred embodiment three parallel catenary lines or cables 14 are provided fixedly connected to the leading edge of the rim and extending therefrom in a longitudinal direction. The other ends of the caternary lines 14 are connected to the trailing edge of the rim by way of slot adjustment lines 58 as hereinafter described. These lines or cables extend in a longitudinal direction, that is parallel to the direction of flight of the vehicle during gliding.

A plurality of fabric catenary curtains 16 are provided between the sail and the catenary lines 14. Each of these catenary curtains is a substantially triangular piece of fabric having the upper edge secured to the sail 13. The lower edge of each catenary curtain 16 is fastened to a catenary line 14 along a portion of the length of the catenary line. The balance of the length of the catenary line 14 is secured directly to the sail. The catenary lines which preferably comprise nylon or polyester cable are preferably secured to the fabric by wrapping and stitching or by any other conventional means as will be apparent to one skilled in the art.

The three catenary lines in conjunction with the three catenary curtains divide the sail 13 into four panels, namely, two side panels 17 and two center panels 18. The side panels 17 are approximately triangular in shape with one curved edge 19 secured to the inflatable rim 12 and another side edge 21 secured along its length to a catenary line 14 or catenary curtain 16. The side edge is also secured to a side edge of an adjacent center panel 18. Thus a leading edge of the side panel 17 is secured to the rim and a side edge is secured to the cantenary line 14 either directly or through the catenary curtain 16.

Similarly the center panels 18 have a leading edge 22 secured to the rim 12 and side edges 21 secured to each of two catenary lines 14 either directly or by way of a catenary curtain 16. In both the side panels and center panels of the sail the trailing edge 23 is free.

The sail 13 forms an airfoil under aerodynamic loading that has a camber to provide lift. The nomenclature employed to describe the airfoil resulting from aerodynamic loading is conventional nomenclature applied to airfoils employed for aircraft wings and the like. Thus a straight line between the leading edge and the trailing edge of the airfoil is known as a chord line. The chord line of the airfoil is an imaginary line between the leading and trailing edges as distinguished from the ropes or cables forming the catenary riser lines and other tangible portions of the vehicle herein described.

In the substantially circular airfoil provided in the preferred embodiment of this invention the chord line for all portions extends between the rim and the trailing edge of the sail in a longitudinal direction, that is substantially parallel to the direction of gliding flight of the vehicle. The camber of the airfoil is the deviation of the actual airfoil shape from the chord line. Conventionally the chamber is expressed as a percentage which comprises the ratio between the distance from the chord line and the length of the chord line. The maximum camber of the airfoil is the maximum deviation of the airfoil from the chord line. The camber line is a line following the center of thickness of the airfoil and in the airfoils here involved is a simple smooth curve. In the airfoils provided according to the practice of this invention the thickness is effectively zero for the purposes of determining air flow characteristics and the camber line is the contour of the airfoil. The angle of attack of an airfoil is the angle between the chord line of the airfoil and the direction of impingement of free stream air in the airfoil. Thus in an airfoil traveling in a direction exactly parallel to the chord line, the angle of attack of the airfoil is zero and if the airfoil is rotated so that the leading edge is raised relative to the trailing edge, the angle of attack is a positive angle corresponding to the degree of rotation.

Each of the panels 17 and 18 of the sail 13 and the catenary curtains 16 are suitably tailored or shaped so that under aerodynamic loading a high lobe is formed across each panel between the two edges thereof. Thus in a transverse direction relative to the line of flight of the vehicle the sail comprises four lobes having three interlobe nodes at the panel edges 21 secured to the catenary lines 14 either directly or by way of the catenary curtains 16. The sail and curtains are also tailored so that camber is provided in the panels in the longitudinal direction. This tailoring provides a nearly spherical curvature in the panels under aerodynamic loading in the region of maximum aerodynamic pressure with an optimum angle of attack. This maximum pressure occurs approximately 25–30 percent of the length of the sail chord line from the leading edge of the vehicle. The curvature of the panel lobe grades into nearly a cylinder at the trailing edge of the sail. It has been found that a maximum camber of about eight to twelve percent is satisfactory for high lift, and high lift over drag ratio.

Aft of the sail there is provided a flap 26 which is also secured to the underside of the inflatable rim 12 around a portion of the periphery thereof. The leading edge 27 of the flap is fixedly secured at the ends thereof to the inflatable rim 12 at a point approximately corresponding to the attachment of the trailing edge 23 of the sail 13 to the inflatable rim. It may be desirable in some applications to provide some overlap of the flap and sail at the rim to minimize the size of gap therebetween in some flight modes and securing the flap to the underside of the rim and the sail to the upper side minimizes interference therebetween. The leading edge of the flap has a considerably shorter extent or length than the trailing edge of the sail. This makes the flap tighter than the sail and increases the transverse load at the leading edge of the flap to make it approximately equal to the transverse load on the rim at the trailing edge of the sail. Such loading is desirable for rim stability since it gives a minimum bending moment.

In a manner similar to the sail, the flap is divided into side panels 28 and center panels 29 which are each tailored to provide a transverse series of low lobes and a series of interlobe nodes. Additionally the flap panels 28 and 29 are tailored to provide longitudinal camber of about eight to twelve percent to give aerodynamic lift. The leading edge 28 of the flap is free and directed into the aerodynamic flow under a gliding flight angle of attack. The trailing edge 31 of the side panels 28 is continuously secured to the rim. The trailing edge 32 of the center panels 29 is also continuously secured to the inflatable rim 12. The side edges 33 of the panels are secured together by stitching or the like to provide interlobe nodes and there is also provided a reinforcing line (not shown) secured to the fabric flap along the node for carrying most of the load at this interconnection. Similarly a reinforcing line can be secured along the leading edge of the flap for carrying most of the load from the flap to the rim.

A payload 11 is suspended below the lifting body 10 by means of a plurality of forward riser lines 36 and aft riser lines 37. The forward riser lines 36 are fixedly secured to the inflatable rim 12 at attachment points 34 along the portion of the periphery of the rim where the sail 13 is secured. It is preferred in order to obtain load equilibrium and minimize bending moments in the rim, that a riser line be secured to the inflatable rim in the region where each catenary line is secured to the rim. Similarly the aft riser lines are secured to the inflatable rim 12 at attachment points 35 around the portion of the periphery thereof where the flap 26 is secured to the rim. Preferably the aft riser lines are secured to the rim in the region where the nodes of the flap encounter the rim. This also assures a minimum bending moment on the inflatable rim. A plurality of control lines 38 are secured to the leading edge 27 of the flap at the nodes 33 thereof. The riser lines and control lines are attached to the payload 11 as described hereinafter. The attachment of these lines is shown schematically in FIG. 1 and in more detail hereinafter. The lines employed in fabricating a vehicle of the type described are preferably nylon or polyester cable of the type employed in parachutes since they have a high strength to weight ratio and good properties such as stability and shock attenuation.

It is found that an average chord line, the line between the leading and trailing edges of the sail 13, that makes an angle of from about 14° to 20° relative to the plane of the inflated rim 12 provides a good aerodynamic configuration for a high $L/D$ ratio in gliding flight. An optimum angle of 17° has been found for the illustrated vehicle. FIG. 3 illustrates the vehicle of FIGS. 1 and 2 as viewed from the front in a direction parallel to the average chord line of the sail. The circular inflatable rim 12 is thus viewed at an angle of approximately 17° from its plane and the rim appears as an ellipse in this projection. The panels of the sail are tailored so that the trailing edge as projected in the same direction has an average location lying approximately along a portion of the periphery of the illustrated ellipse. Thus the angle between the average chord line between the leading edge on the inflatable rim and the trailing edge of the sail is approximately 17° relative to the plane of the rim. Due to the eight to twelve percent camber provided in the panels of the sail the panels billow above the chord line under aerodynamic loading as illustrated in FIG. 3.

In order to obtain pitch stability aerodynamic decalage is provided between the sail 13 and the flap 26. It is found that a positive decalage of about 0 to 10° when the vehicle is trimmed for maximum $L/D$ as described hereinafter provides good pitch stability in a vehicle of the type described. Thus the average chord line of the flap extends at an angle of about 0 to 10° from the plane of the circle formed by the inflatable rim and lies below this plane. This angle is found to provide good pitch stability in a vehicle wherein the sail has a length along the flight direction of about three-fourths of the rim diameter and the flap has a length of about one-fourth of the rim diameter as is illustrated in FIGS. 1–3. It is found that a decalage as low as 0°, that is, with the average chord line of the flap parallel to the average chord line of the sail, still gives good pitch stability. It is considered that this is due to the small stagger between the sail and flap which places the leading edge of the flap in the downwash aft of the sail. Thus although the geometric angle of attack of the sail and flap is the same, the effective angle of attack of the flap is lower because the actual air flow present is not parallel at all places and effective aerodynamic decalage is provided by angles of 0 to 10° between the sail and the flap.

Lateral stability is excellent in a vehicle of the type described. Since the sail is divided into lobes, an appreciable amount of near-vertical surface area is provided by the sail. This is particularly true near the trailing edge of the sail near the rim where the sail may billow beyond the periphery of the rim and pass through vertical before joining to the rim. In addition, the catenary curtains provide additional vertical surface toward the aft portion of the vehicle and further assure the absence of weathercock instability. As will be apparent to one skilled in the art, the vertical area can be selected to reduce any tendency toward spiral divergence or Dutch roll instability; however, this would not appear necessary since in actual flight no such tendency toward instability has been noted, probably due to the favorable location of the center of gravity substantially below the center of lift.

The circular shape of the inflated rim provides a high buckling strength rim with minimum weight. Previously employed inflatable guiding vehicles have had straight booms that are side loaded and therefore subject to buckling under the induced bending moments at joints between booms. The circular arrangement of the rim of the described vehicle provides a geometry with minimum bending moments and very small tendency toward buckling. It is found that relatively small cross-section circular rims with relatively low pressurization are sufficient to support substantial loads. Thus, for example, with an aerodynamic loading on the lifting body of one pound per square foot, a twenty foot diameter rim has a 4.5 inch cross-sectional diameter and is pressurized at about 10 p.s.i.g.; and a rim forty feet in diameter would employ a rim having a 5.2 inch cross-sectional diameter and a pressure of 30 p.s.i.g. These involve tensile loadings on the tube of 23 and 78 pounds per inch respectively. It is desirable to keep the diameter of the tube making up the rim small for aerodynamic reasons, hence it is preferred to increase the pressurization to obtain the required strength. Pressurization with compressed gas alone is preferred, however, it will be apparent that a foam material can also be employed in the rim to provide additional rigidification. Such a foam is preferably generated after the rim is deployed and comprises a conventional polyurethane foam or the like.

The rim is preferably circular, however, it is also contemplated that a polygonal frame of substantially circular shape could be employed. This has an advantage in ease of fabrication since individual straight tubular segments are made and joined to produce the rim. The corners of such a polygon would be the points where riser lines attach to the rim to minimize the bending moments in the rim. Similarly an inflatable rim has been illustrated in the preferred embodiment, but it will be apparent to one skilled in the art that a rim formed of hinged rigid sections might be employed or a rim with an expandable spring member in the rim.

The length of the riser lines has some effect on the tube size and presurization since this determines the angle between the riser and the rim and hence the bending moment on the rim. The preferred riser line length is of the same order as the diameter of the rim or slightly longer. For orderly deployment the riser lines should be long enough that the lifting body trails the payload by at least three times the effective diameter of the payload.

As is the case with all types of trailing textile decelerators the aerodynamic vehicle provided in the practice of this invention requires an orderly deployment for reliability and low loading. One of the principal advantages of the described vehicle is that it may be treated as a conventional parachute during deployment. During deployment the vehicle is very similar to a flat circular canopy type of parachute except for the transverse slot between the sail and the flap. Calculations for the snatch force, opening velocity and shock and equilibrium drag before the tubular rim is pressurized are similar to the calculations for parachutes. A method commonly used for deploying parachutes employs a pilot parachute to withdraw the canopy from its pack and a deployment bag to guide the parachute for positive and proper inflation of the canopy. An exactly similar arrangement is preferably employed for deployment of the aerodynamic vehicle described herein. The initial forces on the deploying vehicle are the snatch force and opening shock and by employing good design practice, these forces are not additive but are separated by a short time period.

Deployment of trailing aerodynamic decelerators creates a snatch force which arises from the differential velocity of the payload and the decelerator which is drifting aft. When the decelerator is rapidly accelerated to the speed of the payload, an inertia force is developed that is readily determined from the differential velocity, weights, and suspension line elongation characteristics. The drag area of the canopy should be minimized during deployment to minimize the differential velocity. A number of analytical methods have been developed in parachute technology for calculation of opening shock due to canopy inflation and it is desirable to employ these to minimize the weight of the lifting body and still maintain an adequate margin of safety. It is found, in general, that the load factor for the opening shock approaches two for the described vehicle, that is, a load of twice the suspended weight is transmitted when the sail and flap inflate. The exact value of opening shock force is, of course, dependent on initial vehicle velocity, altitude at deployment and other factors that affect filling time of the canopy.

The shock force is also affected by design features such as the porosity of the canopy and the size and shape of the canopy mouth. The shape of the canopy mouth opening is determined by the number and length of the riser lines and the excess material forming indents in the mouth. As the number of riser lines is reduced, the maximum critical opening velocity of the decelerator decreases. The described vehicle requires fewer suspension lines than a conventional parachute from a structural point of view because of the inherent stiffness of the peripheral tube, and it may be found that more risers than are required by structural criteria are needed for proper deployment. The size of the canopy mouth is preferably controlled by reefing as described above and after the sail and flap are inflated, the reefing is severed by an explosive cutter or the like.

Porosity is important in the design of a canopy, whether the porosity is achieved by the use of permeable cloth or from openings deliberately included in the design. The porosity not only affects deployment characteristics but also flight stability, solid parachutes having substantial swinging during descent. The described vehicle has a low degree of swinging with the rim uninflated and with the rim inflated and the slot open, excellent stability is obtained at all descent angles. In order to provide proper inflation of the described vehicle in some instances reefing of the slot may be desirable. The amount of reefing in a particular application with a selected porosity fabric is readily determined from conventional parachute technology.

Figure 4C:
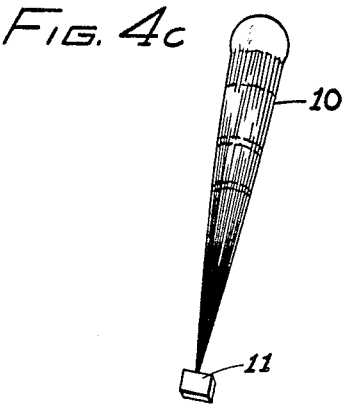
Figure 4D:
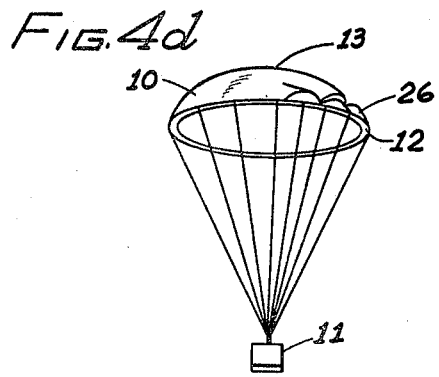

A distinct advantage of a lifting vehicle constructed according to the principles of this invention is that it is readily deployed from a payload in a conventional manner, exactly analogous to a conventional parachute. FIG. 4 illustrates a typical deployment sequence for a vehicle of the type described herein. Initially as illustrated in FIG. 4a a pilot parachute 41 is deployed from the payload 11. This pilot parachute serves to stabilize the payload in a correct attitude and to assist in extraction of the lifting body 10 from its containing cannister in the payload. For orderly deployment a bag 42 may be employed just as for a conventional parachute. Once the lifting body is snatched from the payload the lines are stretched as in FIG. 4b with the lifting body in a squid shape. When the lines are stretched the sail and flap of the vehicle are inflated due to air flow into the fabric lifting body as it falls. It is usually preferred to maintain the body in a reefed condition by conventional parachute reefing lines (not shown) as illustrated in FIG. 4c until the sail and flap are fully inflated to minimize the shock load on the riser lines and on the fabric. After initial reefed canopy inflation the reefing is released by a latch or an explosive release and the uninflated rim on the lifting body expands to about 70 percent of its inflated condition due completely to aerodynamic load on the sail and flap. Such a condition is illustrated in FIG. 4d wherein the lifting body 10 performs substantially as a conventional drag parachute. The initial deployment, reefing, dereefing and inflation of the sail and flap is substantially the same as in conventional drag parachutes.

Figure 4E:
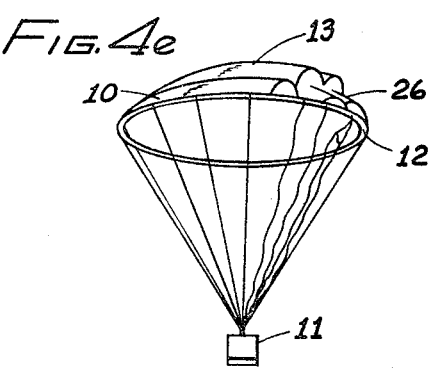
Figure 4F:
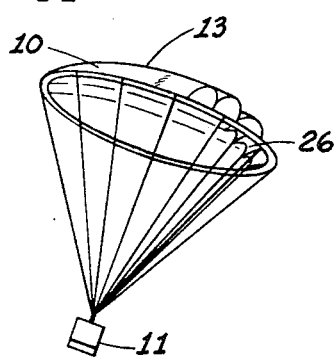

When the sail and flap are fully inflated in the vertical descending mode illustrated in FIG. 4d and the payload is stabilized, the inflatable rim of the lifting vehicle is inflated by means of a conventional gas generator or stored compressed gas, either of which is conveniently carried in the payload and transmitted to the rim by means of the inflation tube (FIG. 1). This enlarges the diameter of the rim to its full size by eliminating bulges or scallops in the rim between the riser lines and flattens the geometry of the sail and flap as illustrated in FIG. 4e. In this trim the lifting body continues to perform as a purely drag device and descend vertically. The trim of the vehicle is then adjusted by shifting the center of gravity of the payload to increase the angle of attack of the lifting body and bring the overall vehicle into a gliding path as illustrated in FIG. 4f.

FIGS. 5 and 6 illustrate a typical control arrangement for an aerodynamic body incorporating the principles of this invention. As illustrated in this embodiment there is provided a bridle arrangement for shifting the center of gravity of the payload relative to the lifting body. FIG. 5 illustrates the control arrangement employed when the vehicle is descending in a vertical descent mode with little or no horizontal velocity component, that is, descending as a pure drag vehicle with little lift. FIG. 6 illustrates the control arrangement employed when the vehicle is trimmed for gliding flight with a maximum $L/D$.

The forward riser lines 36 from the rim of the lifting body (not shown in FIGS. 5 and 6) are brought together and half of the forward riser lines are secured to each of two forward suspension points 44 each of which preferably comprises a ring to which the various lines are fixedly secured. Similarly the aft riser lines 37 are brought together and secured to a single aft suspension point 45. Two forward link lines 46 are provided, each interconnecting one of the forward suspension points 44 and one of a pair of forward attach points 47 fixed on the palylod 11 or on a platform for supporting a payload. Similarly an aft link line 48 interconnects the aft suspension point 45 with an aft attach point 49 fixed on the payload. A pair of bridle lines 51 is provided so that one bridle line interconnects each forward suspension point 44 with the aft suspension point 45. Thus the forward riser lines 36 are secured to the payload by forward link lines 46 of fixed length and the aft riser lines 37 are secured to the payload by an aft link line 48 of fixed length. This provides three point suspension of the payload at attach points 47 and 49 having a fixed relation to each other and a three point suspension from the riser lines wherein the distance between the forward suspension points 44 and the aft suspension point 45 is determined by the length of the brindle lines 51.

The forward suspension points 44 are each connected to one of a pair of winches 52 by one of a pair of radius lines 53 each of which is connected to one of a pair of winch lines 54 at one of a pair of control points 56. Each of the winch lines 54 is secured to the drum of one of the winches 52. Half of the control lines 38 from the lifting boyd are attached to one of the two control points 56 and the other half of the control lines are secured to the other of the two control points 56. In case of an odd number of control lines, the center line is divided and connected to both control points 56 (FIG. 1). Thus the distance between the control point 56 where the control lines 38 are secured and the payload 11 is adjustable by control of the winches 52. The winches are preferably electrically driven and can readily be controlled from within a flying vehicle or remotely from a ground station or by a conventional timer as will be apparent to one skilled in the art. It will be apparent that a single winch can be employed if pitch control only is needed and there is no requirement for steering the vehicle.

In FIG. 5 the winch lines 54 are extended so that the forward and aft suspension points 44 and 45 respectively are shifted forward relative to the center of gravity of the payload 11. With the winch lines 54 extended, the control points 56 are extended far above the payload 11 relative to the fore and aft suspension points 44 and 45 respectively. As described further hereinafter, this permits the flap to rise relative to the rim and minimizes air flow through the gap between the sail and the flap. The attach points on the payload are arranged relative to the center of gravity so that with the suspension points in the position illustrated in FIG. 5, the center of gravity is nearly symmetrically disposed relative to the suspension points. This serves to trim the lifting body so that vehicle descends vertically with little, if any, lift.

In FIG. 6 the winch lines 54 are retracted which in essence shifts the forward suspension points 44 and aft suspension point 45 rearwardly relative to the center of gravity of the payload thereby permitting the leading edge of the lifting body to be higher than the trailing edge, and giving an angle of attack for high lift that is readily trimmed for a maximum $L/D$. In addition to shifting the center of gravity of the payload relative to the rim of the lifting body, the retraction of the winch lines 54 also draws the control points 56 closer to the payload and draws the leading edge of the flap to which the control lines 38 are attached downward relative to the rim of the lifting body and adjusts the aerodynamic decalage.

In addition to controlling fore and aft shifting of the center of gravity to trim the vehicle in pitch, lateral control is provided by the control arrangement illustrated in FIGS. 5 and 6. Differential extension or retraction of the winch lines 54 shifts the center of gravity of the payload from side to side relative to the suspension system and hence relative to the lifting body 10. Since in a gliding mode of flight the center of gravity is located forward of the center of the suspension system, some yawing moment is introduced in the vehicle by shifting the center of gravity to one side of the center of symmetry. In addition, the asymmetrical position of the payload under the lifting body and the warping of the flap both cause a rolling moment. These moments cause a change in the flight direction and permit lateral control or steering of the vehicle in gliding flight.

As will be apparent to one skilled in the art, if a lifting body of the type illustrated in a preferred embodiment is employed as a personnel parachute or the like, the control and riser lines can be manually manipulated in a manner analogous to the control provided by the winches for control of the lifting body. Similarly in cargo deliveries where precise control is not required, control and riser lines having a fixed length can be employed so that the vehicle when fully deployed is trimmed for a desired $L/D$ ratio. In such a deployment it may be desirable to temporarily connect the riser and control lines in an arrangement that permits vertical descent as a conventional parachute prior to inflation of the peripheral rim.

Figure 7:
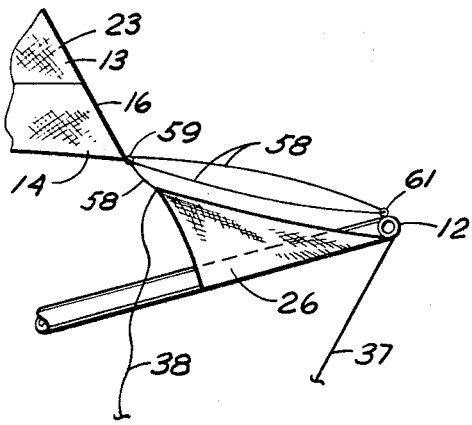
FIG. 7 is a partial sectional view illustrating a typical connection arrangement between the sail, flap, and rim of the lifting body of FIG. 1 in a control position for vertical descent.
Figure 8:
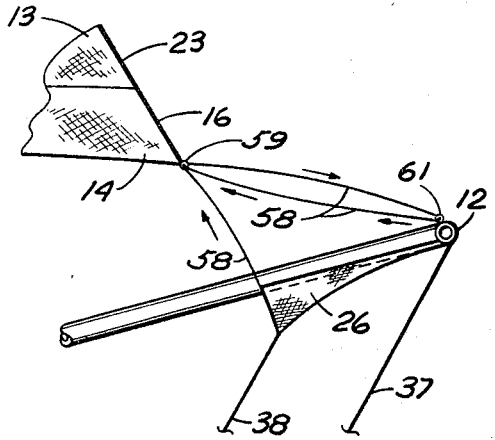
FIG. 8 is a view similar to FIG. 7 and shows the connecting arrangement for a maximum L/D position.

FIGS. 7 and 8 illustrate a typical attachment arrangement between the control lines 38, the leading edge 27 of the flap 26, the catenary lines 14 and the inflatable rim 12 of the lifting body 10. Each of the control lines 38 is secured to the leading edges 27 of the flap at one of the nodes thereof. Also secured to the leading edge of the flap at each node is a slot adjustment line 58 which passes through an eyelet or pulley 59 which is attached to a catenary line 14 at the trailing edge of a catenary curtain 16. Each slot adjustment line 58 then passes through an eyelet or pulley 61 attached to the trailing edge of the inflatable rim and returns to the eyelet 59 on the catenary line 14 to which the end of the slot adjustment line 58 is secured. This provides a doubling arrangement on the length of the slot adjustment line between the rim and the catenary line which provides a variable opening for the slot between the trailing edge of the sail and the leading edge of the flap in response to variations in position of the control lines 38 as described hereinafter. Additionally by providing a double connection between the catenary line 14 and the rim 12 as compared with a single connection between the catenary line and the leading edge of the flap, the angle of application of force on the catenary line and curtains and hence on the trailing edge of the sail is adjusted to an angle to give good equilibrium conditions.

Figure 10:
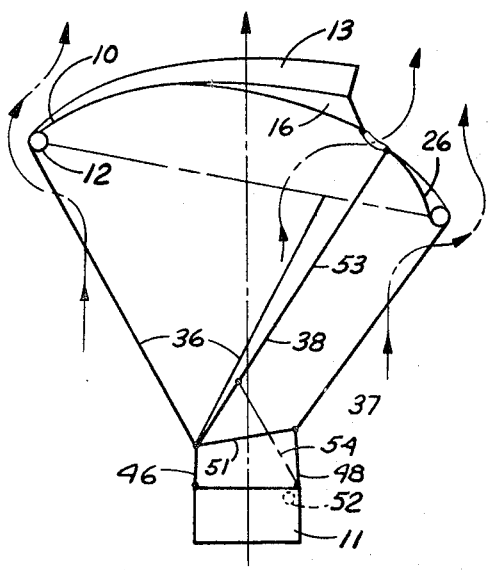
FIG. 10 is a schematic showing of the vehicle of FIG. 9 wherein the rim is inflated and the vehicle is trimmed for vertical descent.

In FIG. 7 the relation between the flap and the sail is illustrated in a position corresponding to a vertical descent mode, that is, where the winch lines 54 are extended as illustrated in FIG. 5. In this condition the control lines 38 are reasonably slack and the leading edge of the flap is drawn close to the catenary curtain due to the aerodynamic load on the sail and flap. A portion of the load of the sail is transmitted to the rim by the doubled portion of the slot adjustment line 58 and the length of the single portion of the slot adjustment line between the leading edge of the flap and the eyelet 59 is at a minimum. The flap thus approaches the position of the sail and the vehicle operates in a manner quite similar to a conventional parachute except that a transverse slot extends thereacross through which air flow can occur. It should be noted that the lengths of the riser lines supporting the payload below the rim are arranged so that the trim of the rim relative to a local vertical is such that air flow through the slot and around the aft portion of the rim is substantially equal to the air flow around the forward portion of the rim (FIG. 10). Thus no substantial horizontal velocity is imparted to the vehicle when operating as a pure drag parachute.

FIG. 8 illustrates the typical connection of FIG. 7 in the control position wherein the winch lines 54 are withdrawn as illustrated in FIG. 6 to provide a high $L/D$. In this control arrangement a substantial tension exists in the control lines 38 thereby drawing the leading edge 27 of the flap downward to an average position below the plane of the rim 12. This tension on the control lines 38 extends the single portion of the slot adjustment lines 58 at the expense of the doubled portion so that the slot between the trailing edge of the sail and the leading edge of the flap is enlarged. Additionally, due to the downward component of the force on the slot adjustment line 58, the catenary line 14 is also drawn somewhat downward to give an overall flattening of the sail. When properly loaded the control lines 38 pull the flap 26 into a position providing optimum aerodynamic decalage with the sail. Thus, in addition to shifting the center of gravity of the payload, retraction of the winch lines (FIG. 6) adjusts the flap angle so that aerodynamic decalage exists to provide pitch stability.

Although a particular control arrangement has been shown for shifting the center of gravity of the payload relative to the lifting body, it will be apparent that other control line arrangements can be provided for a vehicle of the type described. In addition to center of gravity shifting control of the vehicle can be obtained by controlled motion and warping of the flap or of the sail as hereinafter described. It is preferred to employ at least a three point suspension system for control of the vehicle, however, it may be desirable in some applications to secure all of the riser lines together temporarily during employment and provide a single strong attachment point to the payload rather than constructing each of the attachment points with sufficient strength to take the full deployment loads.

Figure 9:
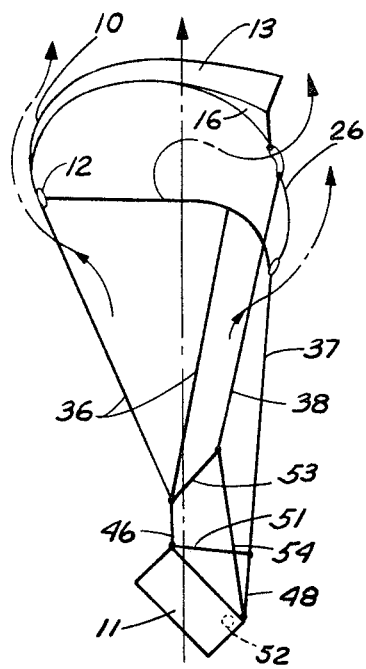
FIG. 9 is a schematic view showing the general arrangement of a flexible vehicle constructed according to the principles of this invention when the rim in uninflated and the vehcile is undergoing vertical descent.

FIGS. 9–12 provide a schematic representation of a lifting body 10, payload 11, and suspension lines 36–38 as provided in an embodiment of the invention in a variety of trim conditions. Arrows are included in these figures to give some indication of the approximate air flow occurring around the lifting body. FIG. 9 illustrates an aerodynamic vehicle trimmed in the manner illustrated in FIG. 4d wherein the rim 12 is not inflated and the vehicle descends in a vertical direction in a manner similar to a conventional drag parachute. In this arrangement the winch lines 54 are extended so that the flap 26 approaches the position of the sail 13. Because of the asymmetry of the lifting body 10, the rim 12 does not lie in a single plane and the aft portion of the payload is at a substantially lower elevation than the forward portion of the payload. The excess material (not shown) in the rim bulges out between the riser lines similar to a conventional parachute. The asymmetrical arrangement of the lifting body 10 equalizes the air flow around the forward and aft portions of the body with the air flow through the slot between the sail and flap so that a substantially vertical descent occurs. The payload in this descent mode is supported principally by the forward riser lines 36 and partially by the aft riser lines 37 with only a small amount, if any, of load supported by the control lines 38.

FIG. 10 illustrates an aerodynamic vehicle as provided in the practice of this invention wherein the rim 12 is inflated and the vehicle is trimmed for vertical descent. This condition corresponds to the deployment step illustrated in FIG. 4e and the contral line arrangements of FIGS. 5 and 7. In this vertical descent mode the winch lines 54 are extended so that the flap approaches the position of the sail as previously described. The weight of the payload is supported by the forward and aft riser lines 36 and 37 respectively with the control lines 38 being substantially slack. Substantially uniform air flow occurs around the leading edge of the rim and around the trailing edge and through the slot so that vertical descent occurs with little, if any, horizontal component.

Figure 11:
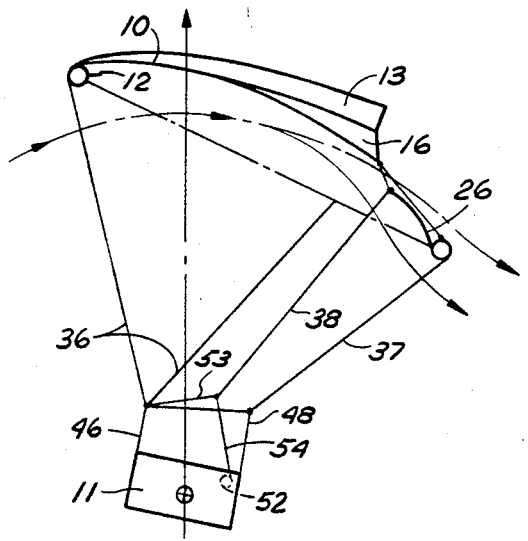
FIG. 11 illustrates schematically a vehicle of the type illustrated in FIG. 9 trimmed for maximum coefficient of lift.

FIG. 11 illustrates an aerodynamic vehicle as provided in the practice of this invention trimmed for a maximum coefficient of lift. In this mode the winch lines 54 are partially retracted so that the center of gravity of the payload 11 is shifted forward relative to the lifting body 10. The payload is supported principally by the forward and aft riser lines and a relatively small load is applied to the control lines 38. This small force on the control lines causes some opening of the slot between the flap and sail thereby substantially increasing the flow along the flap and sail and providing a high lift due to the substantial camber in the sail and high angle of attack of the lifting body. This descent mode provides a maximum coefficient of lift, however, it also has a substantial drag coefficient. Thus despite the high lift obtainable this mode is not preferred for sustained gliding, but is convenient for flare maneuvers. The aerodynamic decalage between the sail and flap in this gliding mode provides a flap angle of attack above the angle of attack of the sail and although providing good pitch stability, it is not an optimum gliding mode because of the $L/D$ ration obtainable.

Figure 12:
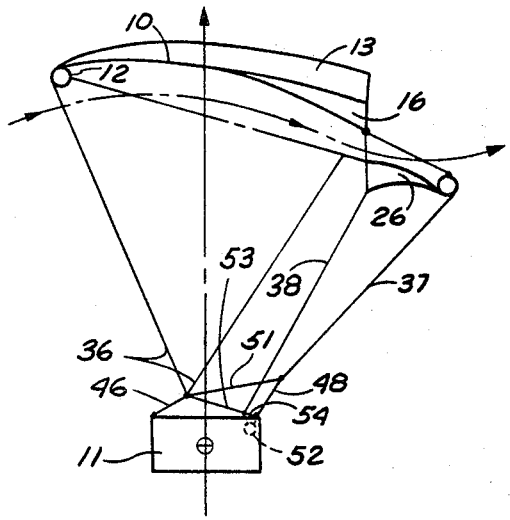
FIG. 12 illustrates a flexible vehicle of the type illustrated in FIG. 9 trimmed for maximum lift over drag ratio.

FIG. 12 illustrates an aerodynamic vehicle according to the practice of this invention trimmed for a maximum $L/D$ and optimum pitch stability. In this gliding mode the winch lines 54 are retracted thereby providing good aerodynamic decalage between the sail and flap with the flap at a lesser effective angle of attack than the sail. The weight of the payload is supported by the forward riser lines 36 and the aft riser lines 37 and partially by the control lines 38. The substantial load on the control lines 38 increases opening of the slot between the sail and flap thereby minimizing the drag of the lifting body that may be due to the biplane effect. The center of gravity is located to provide an optimum angle of attack for maximum $L/D$.

In a typical flight of a vehicle of the type illustrated in a preferred embodiment of this invention the entire structure is ejected from an aircraft or otherwise brought into a free falling condition in the atmosphere. A conventional pilot parachute is deployed to stabilize the payload in a proper falling orientation. The pilot chute may also assist in extraction of the lifting body from a containing package in the payload. After extraction and extension of the riser lines between the payload and the lifting body, the canopy of the lifting body is inflated due to air flowing into it during falling. As has been described it may be preferable to employ a conventional reefing to minimize the opening forces during inflation of the sail and flap forming the canopy of the lifting body. If reefing is employed the reefing line is severed or released in a conventional manner and the canopy fully inflates to form the lifting body into a geometry approximating that of a conventional drag parachute. In this condition the winch lines are at their full extent and the gap between the sail and the flap is at a minimum.

After the canopy is fully inflated the rim of the lifting body is inflated with a pressurized gas thereby enlarging the diameter of the lifting body and flattening the sail and flap. The winch lines remain fully extended so that the gap between the sail and flap is substantially at a minimum and the vehicle continues to descend substantially vertically as a purely drag device. After the vehicle is stabilized in the new descent mode the winch lines are steadily retracted, thereby drawing the flap downward relative to the sail and increasing the gap therebetween. This also serves to shift the center of gravity of the payload relative to the lifting body and gives the lifting body a relatively high angle of attack. This condition also is one of relatively high lift so that the vertical velocity of the vehicle decreases and the horizontal velocity increases as the vehicle commences a gliding flight. It is preferable to withdraw the winch lines relatively quickly through the control position providing a high lift so that the vehicle is trimmed for a maximum $L/D$ in as short a time as possible.

As the winch lines are fully retracted, the flap position and the angle of attack of the vehicle are brought into an arrangement where an optimum $L/D$ is obtained. In this trim the horizontal velocity of the vehicle is maximized relative to the vertical velocity and flight is preferably continued in this trim condition unless a flare maneuver is desired just previous to ground contact. It will be apparent to one skilled in the art that the $L/D$ trim can be varied somewhat by extension or retraction of the winch lines so that the relative horizontal and vertical velocities are adjusted for guidance of the vehicle to a suitable landing area. Similarly as has been described differential extension or retraction of the two winch lines provides lateral steering of the vehicle to a proper landing location. If a flare maneuver is desired previous to touchdown, this is readily provided by controlled extension of the winch lines thereby providing a high lift condition which also has a substantial drag. In this condition both the horizontal and vertical velocities are diminished and it is possible with a vehicle of the type illustrated in the preferred embodiment to achieve a touchdown having both horizontal and vertical velocities approaching zero.

The preferred embodiment of aerodynamic vehicle provided according to the practice of this invention has a sail having an average chord line of about 14 to 20° relative to the rim. It is also preferred that the flap have an angle of about 14–24° relative to the rim when the lifting body is trimmed for a maximum $L/D$. Thus the sail lies substantially above the plane of the rim and the flap lies below the plane of the rim and about 0–10° of positive aerodynamic decalage is provided between the sail and the flap. It has been found in wind tunnel tests and also in free flight that such a geometry provides a vehicle that is stable in pitch. In addition to having excellent pitch stability the aerodynamic vehicle provided according to the practice of this invention has inherent lateral stability so that any tendency to uncontrolled roll or yaw is minimized. In one of the test flights has any tendency toward pitch or lateral instability been noticed.

It is found that an effective angle of attack of the sail of about 6–9° provides a lift over drag ratio for the vehicle of at least 4.66 at a lift coefficient of 0.75. This figure of $L/D$ was obtained with a vehicle having a sail and flap of a fabric having porosity of about ten cubic feet of air per square foot per minute at one-half inch water pressure differential. Higher $L/D$ ratios are obtainable with fabrics of lower porosity. It has also been demonstrated that a coefficient of lift of at least 1.6 is obtainable.

The stability of the described vehicle has been evaluated in a wind tunnel and in free flight. Pitch stability is excellent over a range of angles of attack from a vertical descent to angles of attack so small that the $L/D$ has passed substantially beyond the maximum and the forward portions of the sail lobes lose aerodynamic loading. When the vehicle is descending with uninflated rim, the shape of the canopy approaches that of a hemispherical parachute and similar swing stability is noted. With the rim inflated and the vehicle trimmed for vertical descent, the shape of the lifting body is between that of a conventional flat parachute and a hemispherical parachute and a swing angle of about 10° is found in a manner analagous to conventional parachutes. Due to the porosity of the fabric and air flow through the slot, swinging is not so severe as in a flat parachute. The dynamic stability is poorest in the inflated rim, vertical descent mode and it is preferred to pass through this condition in a minimum time. It is found that in the gliding mode there is no such phenomenon as swinging and oscillations induced by any sort of disturbance damp to half amplitude in less than one second in a simple phugoid type of response. Oscillations are quickly damped to give excellent dynamic stability in both pitch and lateral modes since damping movements are induced in the control lines during oscillations. In the flight made to date no Dutch roll or spiral divergence has been noted.

In order to effect a landing with a minimum vertical velocity it is often desirable to employ a flare maneuver immediately before ground contact. This flare maneuver involves trimming the vehicle to a flight mode giving the maximum coefficient of lift.

Figure 13:
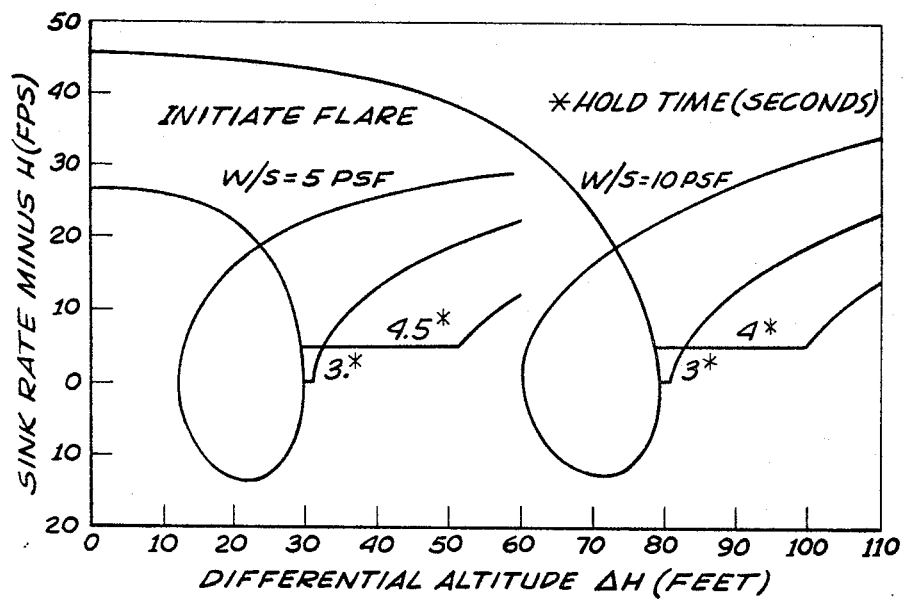
FIG. 13 illustrates the flare trajectories obtainable with a vehicle of the type illustrated in FIG. 1.

FIG. 13 illustrates flare trajectories available with aerodynamic vehicles of the type described having the relatively high wing loads of five and ten pounds per square foot ($W/S$) respectively. It can be seen that even with wing loadings as high as ten pounds per square foot that a positive vertical velocity is possible and that an approximately zero rate can be maintained for about three seconds with either wing loading and that a sink rate of less than five feet per second can be maintained for four or more seconds, thus permitting a degree of lift modulation during touchdown so that the payload can be landed substantially horizontally. No difficulty has been encountered in achieving optimum flare capabilities. In properly trimmed vehicles the horizontal velocity is quite low as well as the vertical velocity, or a substantial horizontal velocity can be obtained to compensate for winds and achieve a very low net ground speed at landing. Thus the described aerodynamic vehicle not only provides an increased horizontal range due to its gliding capability and a selection of landing site because of the ready control available, it is also possible to have a very low vertical velocity touchdown if desired.

It will be apparent to one skilled in the art that other said and flap arrangements can be employed in the practice of this invention. Thus, for example, the vehicle can have a canard configuration wherein the sail, which is the fabric member on the leading edge of the rim, is smaller than the flap which is aft thereof. Such a configuration is desirable in certain control line arrangements although the $L/D$ obtainable from such an arrangement of sail and flap may not be as high as in the embodiment of FIGS. 1 to 3.

Another variation that may be desirable in some situations employs an inflatable rim that has an elliptical shape with the minor axis aligned with the flight direction rather than a circular shape. This serves to increase the aspect ratio during glide thereby minimizing the downwash encountered and providing a good $L/D$. The elliptical shape of the inflatable rim increases the complexity of the riser line arrangement over the relatively simple arrangement provided in the embodiment of FIGS. 1 to 3, and the ellipse requires higher pressurization or larger cross-section in the inflated rim to offset the reduced curvature on the leading edge. It will also be apparent to one skilled in the art that other numbers of lobes and riser lines can readily be employed in the practice of this invention.

Figure 14:
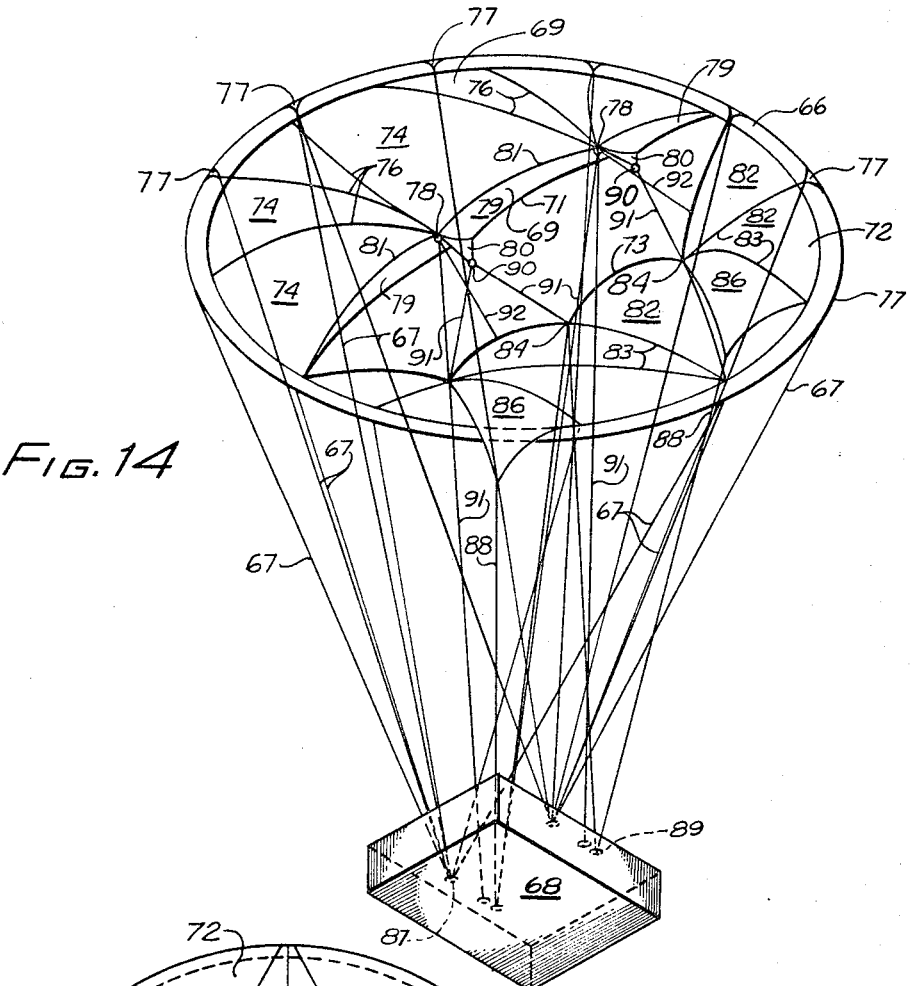
FIG. 14 illustrates in perspective an alternative embodiment of a flexible wing vehicle having substantially equal areas in the sail and flap.

FIGS. 14–21 illustrate another embodiment of an aerodynamic vehicle of the type provided in the practice of this invention. FIG. 14 comprises a perspective view from the underside of such a vehicle in flight. In a manner similar to that employed in the previously described vehicle there is provided an inflatable toroidal rim 66. Suspended from the rim 66 by a plurality of peripheral riser lines 67 is a payload or payload supporting member 68. A sail 69 is secured along the periphery of the rim 66 in the leading edge portion of the rim so as to extend thereacross. The trailing edge 71 of the sail 69 extends across the rim at approximately a diameter thereof so that the sail covers about fifty percent of the open area inside of the rim.

A flap 72 is provided secured along the trailing portion of the inflatable rim 66. The leading edge 73 of the flap 72 extends across the rim in a curving path and the ends of the leading edge 73 of the flap are secured to the inflatable rim 66 at approximately the same point as the ends of the trailing edge 71 of the sail. As is more clearly illustrated in FIG. 15 which comprises a top view of the rim, sail, and flap, the leading edge 73 of the flap is staggered from the trailing edge 71 of the sail so that a substantially diametral slot extends across the rim between the edges thereof.

Figure 15:
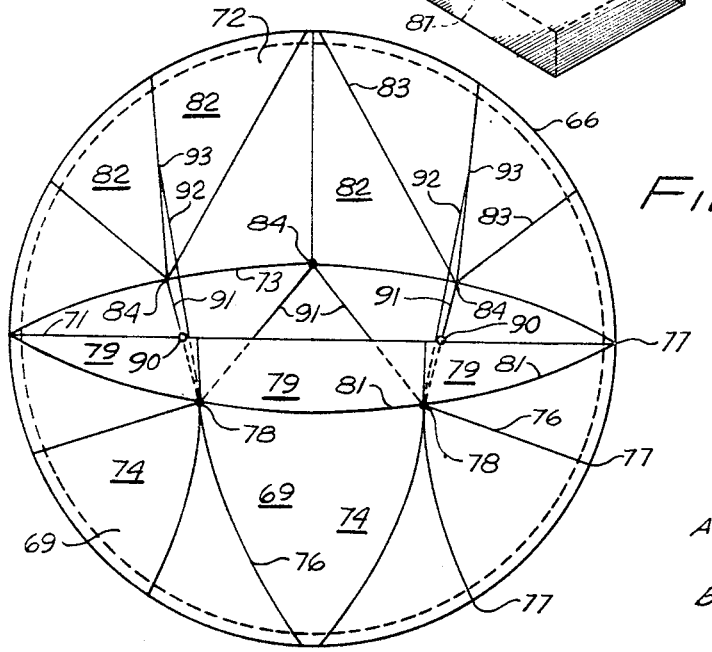
FIG. 15 is a plan view of the vehicle of FIG. 14.
Figure 16:
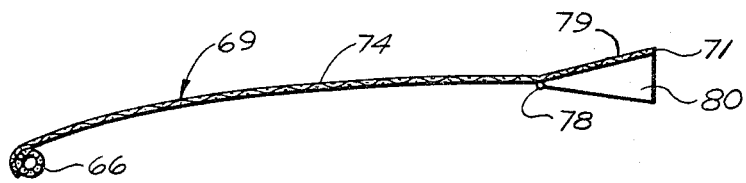
FIG. 16 illustrates schematically the shape of the sail of the vehicle of FIG. 14.

In the embodiment illustrated in FIGS. 14 and 15 the sail is tailored in a plurality of forward panels 74 so that the geometry of the sail under aerodynamic loading can be controlled. It is preferred to orient the fabric in the panel 74 so that the individual fill threads lie approximately tangential to the rim thereby providing optimum strength and proper fabric stretch to obtain the optimum sail geometry. Reinforcing cords 76 are provided at the seams between the panels 74 on the sail for transmitting the principal aerodynamic loads on the sail to the points 77 on the rim where the riser lines 67 are connected. In the illustrated embodiment twelve substantially equally spaced riser lines are employed between the rim 66 and the payload 68. The panels 74 on the sail are tailored so that the sail is substantially smooth and has a continuous curvature in the region near the rim. Nearer the trailing edge 71 the sail is tailored to form three lobes having nodes at the control points 78 hereinafter described.

In the illustrated sail three aft panels 79 are provided in the region of the trailing edge 71 and the aft panels 79 are tailored so as to have three lobes corresponding to the lobes of the sail panels 74. The aft panels 79 also have reflex upward relative to the panels 74 of the sail. This geometry is illustrated schematically in FIG. 16 which shows in cross-section the sail under aerodynamic loading. The panel 74 has camber under aerodynamic loading, as previously described, for providing lift. The panel 79 is reflexed relative to the forward panels 74, that is, the curvature of the sail reverses so that the sail has aerodynamic reflex and the camber line of the sail has a gentle S shape. The reflex of the sail contributes to aerodynamic stability of the vehicle during deployment and flight and it is hypothesized that the reflexed panels 79 in combination with the flap 72 provides a ducting for air passing through the diametral slot between the sail and the flap. This may assure that the trailing vortices are of constant direction of spin so that the aerodynamic load on the flap is constant and no slapping or other evidence of instability is noted. A reinforcing cord 81 is provided in the curving seam between the forward panels 74 and the aft panels 79 on the sail for transmitting loads to the rim.

Substantially triangular reflex curtains 80 are secured to the underside of the sail along the seam between individual aft panels 79. The reflex curtains 80 have one edge secured to the sail and another edge that extends from the sail substantially as an extension of the camber line of the forward panels 74. This permits reflex of the panels 79 relative to the panels 74 and still provides substantially straight line force transmission between the control points 78 and the flap 72 by rigging lines hereinafter described.

In the embodiment illustrated in FIGS. 14 and 15 the flap 72 is divided into a plurality of individual panels 82 that are tailored to provide camber in the flap and are preferably oriented with the fill threads tangential to the rim for optimum strength. Reinforcing cords 83 are provided along the seams between the panels 82 of the flap for transmitting peripheral principal loads to the peripheral rim 66. The panels 82 of the flap are also tailored to provide four lobes in the leading edge 73 of the flap. The lobes have nodes on the leading edge 73 of the flap at the attach points 84 hereinafter described.

Underneath the flap 72 there are provided two fin curtains 86 that are secured to the flap along a line running between side attach points 84 on the leading edge 73 of the flap and each of two of the riser line attach points 77 on the rim. The fin curtains 86 are substantially triangular in shape and serve as substantially vertical surfaces for augmenting longitudinal stability of the vehicle. In the illustrated embodiment the two fin curtains diverge slightly towards the aft edge of the vehicle since it has been found that better longitudinal stability is obtained than with fin curtains that are exactly parallel. The reason for this is thought to lie in the continuous sideward loading of one or both of the fin curtains under flight conditions whereas in a vehicle where the fin curtains are parallel a central null zone is present where neither curtain is aerodynamically loaded and flapping and slight fishtailing may occur. The fin curtains 86 are not exactly vertical since they are more widely spaced at the inflatable rim and the attach points 84 than they are at the other point of the triangle that is secured to the payload by riser lines 88 as hereinafter described.

Figure 17:
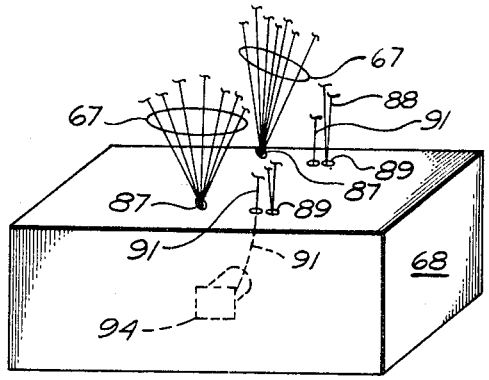
FIG. 17 illustrates in perspective a payload for the vehicle of FIG. 14.

The payload supporting member 68 is suspended from the rim 66 of the vehicle by a plurality of riser lines extending between the twelve equally spaced attach points 77 and either of two fixed forward load points 87 on the payload 68 (FIG. 17). The riser lines 67 from the attach points 77 on one side of the rim connect with one of the load points 87 and the riser lines from the other side connect with the other load point 87. Two riser lines 67 are at each of the attach points 77 that are centered fore and aft on the rim. One of these dual riser lines goes to each of the load points 87 on the payload. The forward load points 87 are substantially equally spaced on either side of the center of gravity of the payload so that the flexible rigging has some torsional moment to minimize oscillations of the payload beneath the aerodynamic lifting body. It is preferred that the load points 87 be located only slightly forward of the center of gravity of the payload.

In addition to the riser lines 67 extending from the payload to the rim of the areodynamic body, there are provided two fixed length riser lines 88 extending between attach points 84 on the leading edge of the flap and two aft attach points 89 fixed on the payload. Each of the riser lines 88 is secured to one of the fin curtains 86 along the leading edge thereof and thence to one of the attach points 84. It is preferred that the aft attach point 89 on the payload 68 be located slightly aft of the center of gravity of the payload to provide pitch stability for the payload. These attach points 89 can be relatively widely spaced as shown or can be brought together to be joined at the payload so as to have three point suspension of the payload from the aerodynamic body.

Two control lines 91 are provided between the payload 68 and the control points 78 on the sail 69. One control line 91 extends between each control point 78 and a corresponding side of the payload 68 between the forward load points 87 and the aft attach points 89. The control lines are preferably wound on individually controlled winches 94 in the payload so that the geometry of the sail can be controlled as hereinafter described. Each control line 91 is split into two separate cables between the payload and the sail before it reaches the control point 78. The two control lines 91 are substantially identical and only one will be described. At the control point 78 on the sail both cables of the control line pass through an eyelet or pulley 90 that is secured to the sail so that the line can move longitudinally relative to the sail. One of the two cables then passes along the lower edge of the reflex curtain 80 (but is not secured thereto) and through another eyelet or pulley 90 that is secured to the lower trailing corner of the reflex curtain. The cable passes across the diametral slot and is secured to one of the side attach points 84 on the leading edge of the flap 82. The other cable of the control line passes across the slot directly from the control point 78 and is secured to the center attach point 84 on the flap.

A fixed length rigging line 92 is also provided between the lower trailing corner of each of the reflex curtains 80 and a ringing point 93 on node lines of the flap. The rigging line 92 transmits some of the aerodynamic load on the sail to the aft portion of the rim and thereby helps equalize the loads on the peripheral riser lines 67. The rigging lines 92 also help minimize the load on the control lines 91.

FIGS. 18, 20 and 21 illustrate schematically steps in deployment and flight of a vehicle of the type illustrated in FIGS. 14 and 15. In FIGS. 18, 20 and 21 only the fore and aft peripheral riser lines 67 have been illustrated so that operation of the vehicle can be more clearly demonstrated. A vehicle of this type is employed for aerodynamic braking and controlled flight of a payload, that is, for example, ejected from an aircraft. Deployment in the initial stages is substantially the same as that illustrated in FIGS. 4a, 4b, and 4c where the main aerodynamic body is drawn from the payload by a drogue parachute and initial inflation of the canopy occurs with the canopy reefed in a conventional manner. After the canopy reefing is released and before the rim 66 of the aerodynamic body is inflated, the aerodynamic body has a geometry substantially like that illustrated in FIG. 18 which is described as the uninflated vertical descent mode. At this point of the flight the rim 66 is secured to the payload 68 by reefed riser lines 67 that are constrained at less than their fully extended length.

Figure 19:
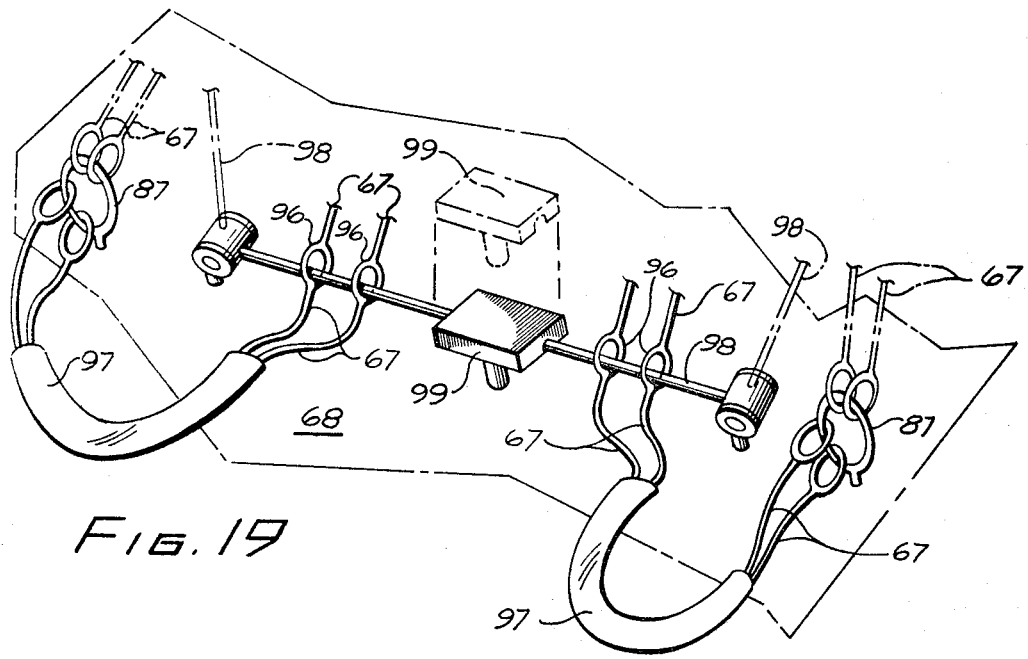
FIG. 19 illustrates a dereefing mechanism for the riser lines of the vehicle of FIG. 14.

FIG. 19 illustrates a convenient mechanism for reefing and dereefing the peripheral riser lines 67. As illustrated in FIG. 19 each of the riser lines 67 has a ring 96 secured in the line at a point between the ends of the line, this point being a uniform distance from the load point 87 on the payload 68 for each riser line 67. In FIG. 19 two riser lines are shown attached to each of the load points 87 rather than the full complement of seven riser lines illustrated in the vehicle of FIG. 14. It will be appreciated, however, that the smaller number of rings and riser lines is illustrated for purposes of clarification and that the additional riser lines 67 that are not illustrated in FIG. 19 are identical to those actually illustrated.

The rings 96 on the riser lines are threaded onto a rod 98 that has one end pivotally connected to the payload 68. The other end of the rod 98 is secured in a closed position against the payload 68 by a clamping member 99. It is preferred that two pivotally mounted rods 98 be employed with the riser lines to one of the load points 87 being on one of the rods and the riser lines to the other load point being on the other rod. This provides symmetry of loading upon initial deployment of the aerodynamic body and minimizes transient effects on the payload. The length of riser line 67 between the ring 96 and the load point 87 is contained in a split plastic tube 97 during the uninflated vertical descent mode to prevent snarling of the riser lines during further deployment.

Upon deployment of the aerodynamic vehicle in the flight condition illustrated in FIG. 18 the riser lines 67 are reefed by securing the rods 98 in the position illustrated in FIG. 19. The load is then taken by the clamping member 99 and the pivot connections at the ends of the rods 98. The excess line length is contained in the tube 97 to minimize tangling. When it is desired to dereef the riser lines 67 to cause the vehicle to pass into a flight mode as illustrated in FIG. 20 hereinafter described, the rings 96 are released and the lines 67 are freed to fully extend. To release the lines the clamping member 99 is released from the payload 68 shown in phantom in FIG. 19. Any conventional releasing mechanism can be employed or the clamping member 99 can merely be moved a position where the ends of the rods 98 are released. Upon release of the ends of the rods 98 by the clamping member the load on the riser lines 67 causes the rods to pivot into the position shown in phantom in FIG. 19. When the rod 98 pivots into such position the rings 96 readily slide off of the rod along the length thereof and the riser lines can extend to their full length with their ends attached to the load points 87. The force on the lines bursts them from the split plastic tube 97 during the deployment and no difficulties are encountered with this type of reefing mechanism.

It will be apparent to one skilled in the art that many other kinds of dereefing mechanisms can be employed in lieu of the one described and illustrated in FIG. 19. Thus, for example, an openable eyelet can be employed for releasing cables and the cables can be constrained in a trough on the payload rather than in the plastic tube illustrated. Another dereefing mechanism that may be desirable in certain applications employs a drum on which the riser lines are wrapped in a parallel array. The drum is locked into a first position when the lines are reefed and the lock is released for dereefing thereby permitting the drum to rotate under the force of the riser lines. This mechanism may be advantageous where a controlled rate of dereefing is desired since any necessary drag can be applied to the rotatable drum.

The riser lines 88 extending between the payload and the attach points 84 on the leading edge of the fin curtains 86 are deployed at full length during the initial inflation of the canopy and uninflated vertical descent mode as illustrated in FIG. 18. This permits the leading edge of the flap to extend above the plane of the uninflated rim during initial deployment. The fin curtains are substantially slack during this stage of deployment and usually at least partially fold up against the flap during flight due to aerodynamic forces. The control lines 91 passing between the payload and the attach points 78 on the sail and thence to the attach points 84 on the leading edge of the flap are in a retracted position during initial deployment of the aerodynamic vehicle. The length of the control lines 91 is sufficient, however, to permit the sail to lie substantially above the plane of the rim on initial deployment. The control lines are sufficiently short, however, to maintain the diametral slot in the aerodynamic body in a relatively closed position. In the stage of deployment illustrated in FIG. 18 the aerodynamic vehicle has the general shape of a hemispherical parachute except for the diametral slot running thereacross. In this stage of deployment the aerodynamic vehicle acts as a conventional parachute and lowers the payload in a substantially vertical direction with the excellent inherent stability of the hemispherical parachute.

When the aerodynamic body is deployed as illustrated in FIG. 18 and is stabilized, inflation of the peripheral rim 66 is commenced. It is found that the rim can be inflated to the normal operating pressure with the vehicle in the deployment position illustrated in FIG. 18 without the rim passing to a fully circular shape since it is constrained by the peripheral riser lines. The inflation causes the rim to become scalloped between the riser attach points 77. After the rim is inflated to the normal gliding flight pressure which is about twice the pressure at which buckling of a circular rim might occur under the normal flight loads, the reefing of the peripheral riser lines 67 is released thereby permitting the inflated rim to pop upwards relative to the center portion of the canopy under the aerodynamic loading of the falling vehicle. The leading edge of the flap and trailing edge of the sail are constrained in their original position relative to the payload during this step. The momentary release of the load by the peripheral riser lines on the rim also permits the inflated rim to pop outward into a circular shape before the load is again applied by the peripheral riser lines 67. This deployment procedure permits the inflation of the rim to no higher than normal operating pressures upon deployment. In order to cause the rim to assume a fully circular shape by inflation pressure alone while the vehicle is subjected to aerodynamic loading requires an internal pressure in the rim of about four times the pressure at which the rim would collapse or about twice the normal operating pressure. Thus it is possible to inflate the rim and pop it into the circular shape by the described dereefing step with about one-half of the inflation pressure that would be required by any other deployment mode.

FIG. 20 illustrates the geometry of the aerodynamic vehicle after the rim 66 has been inflated and the peripheral riser lines 67 dereefed to permit the rim to pop into the fully circular shape. The riser lines 88 to the lower leading corner of the fin curtains 86 are of fixed length and thereby hold the leading edge flap downward during deployment of the inflated rim so that the leading edge of the flap is appreciably below the plane of the rim after it pops into the circular shape. During the stage of deployment represented by FIG. 20 the control lines 91 are also held at a fixed length the same as the length in the deployment condition illustrated in FIG. 18. Thus the trailing edge of the sail is also held below the plane of the rim and the canopy has an inverted shape generally similar to an inverted conical decelerator such as has been previously employed. The inflated rim of the vehicle resists the collapsing forces of the riser lines and sail and flap. The inverted canopy has an inherently stable geometry so that the vehicle in the deployment condition illustrated in FIG. 20 descends vertically in a fully stable condition. It is found in a vehicle in the flight geometry illustrated in FIG. 20 that a very slight forward motion may occur due to ducting effects between the trailing edge of the sail and the leading edge of the flap. However, since the diametral slot is narrow and only a small proportion of the sail tends to give ducting, the vehicle descends substantially vertically and with a slightly lower velocity than obtained in the uninflated vertical descent mode illustrated in FIG. 18.

In order to change from the inflated vertical descent mode illustrated in FIG. 20 to a geometry for gliding flight as illustrated in FIG. 21 the control lines 91 are unreeled from the winches 94 in the payload. The increased effective length of the control lines 91 permits the trailing edge of the sail 69 to rise above the plane of the rim. The riser lines 88 extending between the payload and the lower leading corner of the fin curtains 86 remain at a fixed length so that the leading edge of the flap is retained below the plane of the rim. Since the control lines are free to move through the eyelets 90 at the control points 78 and at the trailing edge of the reflex curtains 80, the extent of the control lines 91 between the trailing edge of the sail and the leading edge of the flap increases, thereby permitting the sail to move further away from the flap, thereby opening the diametral slot. As the control lines 91 are extended the aerodynamic lifting body passes through a geometry having the highest coefficient of lift into a geometry substantially as illustrated in FIG. 21 which provides the maximum $L/D$ ratio. The flight characteristics of the illustrated vehicle in glide are similar to those for the previously described lifting body. It is found in addition that the illustrated embodiment of aerodynamic vehicle has inherent stability throughout the transition between the uninflated vertical descent mode as illustrated in FIG. 18 and the gliding flight mode illustrated in FIG. 21. This inherent stability obviates any need for special control procedures during deployment or flight.

The flight of the illustrated vehicle in the gliding mode is controlled entirely by the two control lines 91. The main weight of the payload is supported by the peripheral riser lines 67 and the riser lines 88 extending to the flap. During gliding flight these riser lines are of fixed length and location so that there is substantially no shift of center of gravity of the payload relative to the aerodynamic body. Thus instead of shifting the center of gravity to obtain pitch and roll control, these functions are both obtained by control of the sail position alone. The coefficient of lift and the $L/D$ ratio are controlled by synchronous extension or retraction of the two control lines 91 which act on the sail to change its position relative to the rim and the flap and hence vary the decalage between the sail and the flap and alter the camber line of the sail. By this means the descent rate of the vehicle is modulated and the rate of horizontal travel is controlled. It is found that synchronous retraction of the control lines provides sufficient lift modulation to effect flare maneuvers very similar to those described for the aerodynamic vehicle illustrated in FIG. 1.

In order to effect a turn with the illustrated vehicle the control lines 91 are differentially extended or retracted thereby warping the sail and shifting the lift vector away from the vertical. In so doing the entire vehicle is caused to roll a small amount and execute turns. It has been found that such a differential extension of the control lines 91 provides adequate steering capability in an aerodynamic vehicle of the type described and introduces no bothersome instability.

Obviously many modifications and variations of the present invention are possible in light of the above teachings. It is therefore to be understood that the invention may be practiced otherwise than as specifically described.

What is claimed is:

1. A flexible aerodynamic body comprising:
    a rigidifiable rim;
    a substantially continuous sail having a plurality of longitudinally extending lobes collectively forming a first lifting surface connected along the leading edge to said rim and having an open trailing edge;
    a substantially continuous flap having a plurality of longitudinally extending lobes collectively forming a second lifting surface connected along the trailing edge to said rim and having an open leading edge displaced rearwardly from the trailing edge of said sail, said flap extending forwardly of said rim, said leading edge and said trailing edge defining an open slot substantially across said body, the average chord line of said sail being angulated relative to the average chord line of said flap to provide aerodynamic decalage.

2. A flexible aerodynamic body as defined in claim 1 wherein said sail is a fabric having camber under aerodynamic loading:
    said flap is a fabric having a camber under aerodynamic loading; and further comprising
    a plurality of riser lines secured to said sail and said flap for supporting a load therefrom.

3. A flexible aerodynamic body as defined in claim 1 further comprising control means for varying the aerodynamic decalage.

4. A method of deploying a substantially circular parachute-like member from a payload, said parachute-like member including an inflatable substantially circular peripheral rim and being connected to said payload by a plurality of riser lines, said method comprising:
  pressurizing the inflatable rim to a normal operating pressure while concurrently maintaining the riser lines between the parachute-like member and the payload in a relatively shorter length; and
  releasing the riser lines to a relatively longer length only after said inflatable rim is inflated to normal gliding flight pressure.

5. A method of providing gliding support for a payload with a parachute like member having an inflatable rim, a sail extending across a portion of said rim, a flap extending across another portion of said rim for forming with said sail an open slot extending substantially completely transversely across said rim, and a plurality of riser lines interconnecting said rim and said payload, said method comprising the steps of:
  launching the payload into the atmosphere at a substantial altitude;
  deploying from the payload the parachute like member;
  inflating the rim on the parachute like member; and
  holding the average chord line of the sail portion of the parachute like member on one side of the slot at a selected angle relative to the average chord line of the flap portion of the parachute like member on the other side of the slot to provide aerodynamic decalage for gliding stability.

6. A method as defined in claim 5 comprising the step of shifting the center of gravity of the payload relative to the parachute like member for shifting the angle of attack of the parachute like member to modulate aerodynamic lift.

7. A method as defined in claim 5 further comprising the steps of:
  maintaining the riser lines between the rim and the payload in a relatively shorter length during inflation of the rim; and
  releasing the riser lines to a relatively longer length only after the rim is inflated to flight pressure.

8. An aerodynamic body comprising:
  a continuous peripheral rim;
  a substantially continuous sail having a first edge secured along a first portion of said rim and having a second edge extending across said rim; and
  a substantially continuous flap extending inwardly of said rim having a first edge secured along a second portion of said rim and having a second edge extending across said rim; and spaced from the second edge of said sail for forming therewith an open slot extending substantially completely transversely across said rim, said sail and said flap collectively extending substantially all along said rim.

9. An aerodynamic body as defined in claim 8 wherein said rim is inflatable to form a substantially rigid, substantially circular frame.

10. An aerodynamic body as defined in claim 8 wherein said sail and said flap each comprise a fabric surface having camber for providing aerodynamic lift and said sail and flap have aerodynamic decalage wherein the angle of attack of said flap is no greater than the angle of attack of said sail; and further comprising control means for controlling the angle of attack of said sail in flight.

11. A flexible aerodynamic body as defined in claim 10 further comprising:
  fabric means substantially normal to the plane of said rim for augmenting lateral stability.

12. An aerodynamic body as defined in claim 11 wherein said fabric means comprises at least one substantially triangular curtain secured along an edge to said flap and attached at an opposite corner to a load supporting line.

13. An aerodynamic body as defined in claim 10 further comprising:
  a payload; and
  a plurality of riser lines interconnecting said payload and said rim; and wherein
  said control means comprises a plurality of variable length control lines interconnecting said payload and the leading edge of said flap.

14. An aerodynamic body as defined in claim 10 further comprising:
  a payload; and
  a plurality of riser lines interconnecting said payload and said rim; and wherein
  said control means comprises a plurality of variable length control lines interconnecting said payload and said sail at a plurality of points near the trailing edge of said rail.

15. An aerodynamic body as defined in claim 8 further comprising:
  a payload support member;
  a plurality of riser lines connecting said rim and said support member and;
  a plurality of variable length control lines interconnecting said support member and said sail and said flap at said second edges respectively extending across said rim.

16. An aerodynamic body comprising:
  a rim;
  a sail having a first edge secured to a first portion of said rim and having a second edge extending across said rim;
  a flap having a first edge secured to a second portion of said rim and having a second edge extending across said rim and spaced from the second edge of said sail for forming therewith an open slot extending substantially completely transversely across said rim;
  a load support member;
  a plurality of riser lines connecting said rim and said support member and a plurality of variable length control lines interconnecting said support member and said sail and said flap and wherein;
  said riser lines and control lines have lengths permitting the second edge of said sail to extend above the plane of said rim under aerodynamic loading and restraining the second edge of said flap below the plane of said rim under aerodynamic loading.

17. An aerodynamic body as defined in claim 8 wherein said sail is formed with a plurality of lobes extending substantially normal to the slot and extending substantially completely from said first edge to said second edge thereof.

18. An aerodynamic body as defined in claim 8 wherein said sail and said flap each have camber for providing lift, and wherein said sail and said flap are mutually angulated to provide aerodynamic decalage for pitch stability.

19. An aerodynamic body as defined in claim 8 wherein said sail has a camber line under aerodynamic loading that has a gentle S shape for providing aerodynamic reflex.

20. An aerodynamic body as defined in claim 19 wherein said sail comprises a first portion having a camber line having a first direction of curvature and a second portion having an opposite direction of curvature for forming the S shape, and further comprising a substantially triangular reflex curtain having a first edge secured to the first portion of said sail and a second edge extending substantially as an extrapolation of the second portion of said sail.

21. An aerodynamic body as defined in claim 20 further comprising a control line connected to said sail at the intersection of the first portion with the second portion for varying the camber line of said sail.

22. An aerodynamic body as defined in claim 8 wherein said rim is inflatable and further comprising:
  a payload member;
  a plurality of riser lines interconnecting said payload and said rim and;
  means for temporarily restraining said riser lines at less than their full length during inflation of said rim and for releasing said riser lines only after said inflatable rim is inflated to normal gliding flight pressure.

23. An aerodynamic body as defined in claim 8 further comprising:
a payload;
a plurality of discontinuously variable length riser lines interconnecting said rim and said payload;
a plurality of fixed length riser lines interconnecting said flap and said payload; and
a plurality of continuously variable length control lines interconnecting said sail and said payload.

24. The method of deploying the body of claim 23 from a position wherein said rim, sail, flap and lines are folded and stored on the payload with the rim in deflated condition comprising the steps of:
releasing said rim, sail and flap from the payload;
releasing said discontinuously variable riser lines to a partially reefed condition less than their fully extended length;
fully releasing said fixed length riser lines;
inflating the rim; and
subsequently releasing said discontinuously variable length riser lines to their fully extended length.

25. A method as defined in claim 24 further comprising the steps of:
restraining said continuously variable length control lines at less than their fully extended length during said releasing steps; and
subsequently increasing the effective length of said control lines.

26. An aerodynamic body as defined in claim 8 wherein said rim is a flexible rigidifiable member;
said sail comprises a fabric having camber for providing a lifting surface under aerodynamic loading and;
said flap comprises a fabric having camber for providing a lifting surface under aerodynamic loading;
said flap having an average chord line angulated relative to the average chord line of said sail so that the effective angle of attack of said flap is no greater than the effective angle of attack of said sail.

27. An aerodynamic body having a longitudinal axis along a direction of flight and a transverse axis normal to the direction of flight comprising:
a rim comprising a flexible inflatable tubular number of toroidal shape;
a plurality of substantially parallel catenary lines each secured at an end thereof to and extending from the leading edge of said rim in a longitudinal direction;
a sail having a first edge secured along a first portion of said rim and having a secured edge extending across said rim and wherein said sail comprises a fabric sail secured to said rim around a portion of the periphery thereof, said sail comprising a plurality of tailored sail panels, each of said sail panels having a leading edge secured to said rim, an edge secured to an adjacent panel and a trailing edge, each of said sail panels being tailored to form a transverse lobe between secured edges thereof under aerodynamic loading and to form a longitudinal camber under aerodynamic loading, the trailing edges of said sail panels collectively forming a sail trailing edge extending between transverse sides of said rim;
fabric catenary curtains connected to and between inter-lobe nodes of said sail and said catenary lines;
a flap having a first edge secured along a second portion of said rim and having a second edge extending across said rim and spaced from the second edge of said sail for forming therewith an open slot across said rim, and wherein said flap comprises a fabric flap aft of said sail secured to said rim around a portion of the periphery thereof, said flap comprising a plurality of tailored flap panels, each of said flap panels having a leading edge, a trailing edge secured to said rim and an edge secured to an adjacent flap panel, each of said flap panels being tailored to form a transverse lobe between secured edges thereof under aerodynamic loading and to form a longitudinal camber under aerodynamic loading, the leading edges of said flap panels collectively forming a flap leading edge extending between transverse sides of said rim, said flap being angulated relative to said sail under aerodynamic loading to provide an aerodynamic loading to provide an aerodynamic decalage; and further comprising:
a plurality of forward riser lines connected to said rim on a portion of the periphery thereof where said sail is secured to said rim for supporting a payload;
a plurality of aft riser lines connected to said rim on a portion thereof where said flap is secured to said rim for supporting a payload;
a plurality of control lines connected to the leading edge of said flap for controlling the flap position; and
lines interconnecting the leading edge of said flap and said catenary lines.

28. An aerodynamic body as defined in claim 27 further comprising:
a payload supporting member;
a first winch on one side of an aft portion of said payload supporting member;
a second winch on the other side of an aft portion of said payload supporting member;
a first winch line on said first winch;
a first radius line having an end connected to said first winch line to form a first control point;
a first forward link line connecting said payload supporting member at one side of a forward portion of said supporting member to another end of said first radius line to form a first forward suspension point;
a second winch line on said second winch;
a second radius line having an end connected to said second winch line to form a second control point;
a second forward link line connecting said payload supporting member at another side portion of a forward portion of said supporting member to another end of said second radius line to form a second forward suspension point;
a first bridle line connected to the first forward suspension point;
a second bridle line connected to the second forward suspension point and to said first bridle line to form an aft suspension point; and
an aft link line connecting the aft suspension point to said payload supporting member between said winches.

29. An aerodynamic body as defined in claim 28 wherein said sail has a camber of from about eight to twelve percent with the point of maximum camber being about one-fourth to one-third of the sail length from the leading edge, and the average chord line of said sail being from about 14° to 20° from the plane of the rim;
said flap has an average chord line of from about 14° to 24° from the plane of the rim whereby a positive aerodynamic decalage of from about 0° to 10° is provided between said sail and said flap; and further comprising slot adjustment lines interconnecting said flap, said catenary lines and said rim, each of said slot adjustment lines having an end secured to the leading edge of said flap at the juncture of adjacent panels and another end secured to one of said catenary lines and intermediate the ends being slidably connected to said catenary line and to said rim so that a single portion of line is between said flap and said catenary line and a doubled portion of line is between said catenary line and said rim.

30. An aerodynamic body as defined in claim 8 having a longitudinal axis along a direction of flight and a transverse axis normal to the direction of flight wherein:
said rim comprises a flexible inflatable tubular rim of toroidal shape;
said sail comprises a fabric sail secured to said rim around a portion of the periphery thereof, said sail comprising a plurality of tailored sail panels for forming a plurality of transverse lobes at the trailing edge of said sail and for forming a longitudinal camber line under areodynamic loading that has a gentle S shape;

said flap comprises a fabric flap aft of said sail secured to said rim around a portion of the periphery thereof, said flap comprising a plurality of tailored flap panels for forming a plurality of transverse lobes at the leading edge of said flap and for forming a longitudinal camber under aerodynamic loading; and further comprising fabric fin curtains connected to and extending from interlobe nodes of said flap;

control lines between said sail and said flap for controlling the relative position thereof; and a plurality of riser lines connected to said rim around the periphery thereof for supporting a payload.

31. An aerodynamic body as defined in claim 30 further comprising:
a payload supporting member connected to said riser lines;
a riser line connected between each of said fin curtains and said payload supporting member; and wherein
each of said control lines is secured at one end to said flap at the leading edge thereof, is connected to said sail by a connection that permits said control line to move longitudinally relative to said sail and is further connected to said payload supporting member by a connection that permits selective extension and retraction of each of said control lines relative to said payload supporting member for controlling said sail.

32. A flexible aerodynamic body as defined in claim 1 wherein the effective angle of attack of said flap is no greater than the effective angle of attack of said sail.

33. A flexible areodynamic body including:
a continuous rim;
a flexible sail forming a first lifting surface having an open trailing edge extending substantially completely across the rim;
a flexible flap forming a second lifting surface having an open leading edge extending substantially completely across the rim, and displaced rearwardly from the trailing edge of the sail; and
means for controllably maintaining the effective angle of attack of the flap in a plurality of selective positions no greater than the effective angle of attack of said sail.

34. A flexible areodynamic body comprising:
a rigidifiable rim;
a substantially continuous lifting sail extending aft from the forward portion said rim covering a major portion of the planform of said body;
pitch control means including a flexible control surface portion extending froward from the aft portion of said rim and covering a minor portion of the planform of said body, the leading edge of said pitch control means being staggered from the trailing edge of said sail substantially throughout their respective lengths.

35. A method as defined in claim 4 further comprising:
deploying the parachute-like member into a reefed, substantially circular shape before inflation; and adjusting lifting surfaces on said parachute-like member after said releasing step for obtaining lift.

References Cited

UNITED STATES PATENTS

| | | | |
|---|---|---|---|
| 1,104,242 | 7/1914 | Bonnot et al. | 244—135 |
| 3,131,894 | 5/1964 | Jalbert | 244—145 |
| 3,141,640 | 7/1964 | Sutliff et al. | 244—138 |
| 3,146,976 | 9/1964 | Houdou | 244—152 |
| 3,289,976 | 12/1966 | Lemoigne | 244—16 |
| 3,301,511 | 1/1967 | Webb | 244—138 |

MILTON BUCHLER, *Primary Examiner.*

RICHARD A. DORNON, *Assistant Examiner.*

U.S. Cl. X.R.

244—152